(12) United States Patent
Wang et al.

(10) Patent No.: US 11,340,411 B2
(45) Date of Patent: May 24, 2022

(54) PLUGGABLE TRANSCEIVER RETAINER

(71) Applicant: FINISAR CORPORATION, Sunnyvale, CA (US)

(72) Inventors: William H. Wang, Pleasanton, CA (US); Bill S. Wang, San Jose, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 73 days.

(21) Appl. No.: 16/854,422

(22) Filed: Apr. 21, 2020

(65) Prior Publication Data
US 2021/0325619 A1 Oct. 21, 2021

(51) Int. Cl.
| | | |
|---|---|---|
| *H04B 10/00* | (2013.01) | |
| *G02B 6/42* | (2006.01) | |
| *H04B 10/60* | (2013.01) | |
| *H04B 10/50* | (2013.01) | |

(52) U.S. Cl.
CPC ......... *G02B 6/4292* (2013.01); *H04B 10/501* (2013.01); *H04B 10/60* (2013.01)

(58) Field of Classification Search
CPC ..... G02B 6/4292; H04B 10/501; H04B 10/60
USPC ........................................................ 398/140
See application file for complete search history.

(56) References Cited

U.S. PATENT DOCUMENTS

| | | |
|---|---|---|
| 6,430,053 B1 | 8/2002 | Peterson et al. |
| 7,040,911 B1 | 5/2006 | Ho et al. |
| 7,083,336 B2 | 8/2006 | Kim et al. |
| 7,114,980 B1 | 10/2006 | Wu |
| 7,264,406 B1 | 9/2007 | Yoshikawa |
| 8,794,848 B2 | 8/2014 | Sasaki et al. |
| 9,470,859 B2 | 10/2016 | Arekar et al. |
| 10,859,779 B1 | 12/2020 | Wang et al. |
| 11,079,558 B1 | 8/2021 | Wang et al. |
| 2002/0150343 A1 | 10/2002 | Chiu et al. |
| 2005/0158051 A1 | 7/2005 | Dodds |
| 2005/0226587 A1 | 10/2005 | Minota et al. |
| 2005/0226626 A1 | 10/2005 | Zhang et al. |
| 2007/0243749 A1 | 10/2007 | Wu |
| 2008/0031577 A1 | 2/2008 | Walker et al. |
| 2009/0209125 A1* | 8/2009 | Bright ................ H01R 13/6275 439/352 |
| 2009/0279831 A1 | 11/2009 | Luo et al. |
| 2011/0267742 A1 | 11/2011 | Togami et al. |
| 2013/0115800 A1 | 5/2013 | Chan |
| 2014/0254993 A1 | 9/2014 | Koutrokois |
| 2015/0117819 A1 | 4/2015 | Chou |
| 2019/0212509 A1 | 7/2019 | Takeuchi |
| 2019/0312645 A1 | 10/2019 | Ishii et al. |
| 2020/0183106 A1 | 6/2020 | Lun et al. |

OTHER PUBLICATIONS

Office Action in copending U.S. Appl. No. 16/854,502, dated Sep. 28, 2021, 13-pgs.

* cited by examiner

*Primary Examiner* — Mohammad R Sedighian
(74) *Attorney, Agent, or Firm* — Blank Rome LLP

(57) ABSTRACT

An optoelectronic module may include a housing enclosing at least one optical transmitter or receiver, a release mechanism configured to engage with a cage sized and shaped to receive the housing, and a retainer including at least one occlusion member sized and shaped to be positioned inside a port of the optoelectronic module and a sleeve member configured to slide with respect to the occlusion member.

20 Claims, 18 Drawing Sheets

PLUGGABLE TRANSCEIVER RETAINER

FIELD

The present disclosure relates to retainers for optoelectronic modules.

BACKGROUND

Unless otherwise indicated herein, the materials described herein are not prior art to the claims in the present application and are not admitted to be prior art by inclusion in this section.

Optoelectronic modules, such as transceivers, may be used to transmit data between different devices or different locations. In particular, optical signals may be used to rapidly communication data (via the optical signals) between different devices or different locations. However, most electronic devices operate using electrical signals. Accordingly, optoelectronic modules may be used to convert optical signals to electrical signals or convert electrical signals to optical electrical, so optical signals may be used to transmit data between electronic devices. Optoelectronic modules typically communicate with a host device by transmitting electrical signals to the host device and receiving electrical signals from the host device. These electrical signals may then be transmitted by the optoelectronic module as optical signals.

One type of host device that may be implemented with optoelectronic modules is a network switch. A network switch may include multiple ports or cages to receive optoelectronic modules. In some configurations, the optoelectronic modules may include a coupling mechanism such as a latch to retain the optoelectronic modules in their respective ports or cages in the network switch. The coupling mechanism may also permit the optoelectronic modules to be removed from the ports or cages. However, in some circumstances, an optoelectronic module may unintentionally disengage from its port or cage.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one example, an optoelectronic module may include a housing enclosing at least one optical transmitter or receiver, a release mechanism configured to engage with a cage sized and shaped to receive the housing, and a retainer including at least one occlusion member sized and shaped to be positioned inside a port of the optoelectronic module and a sleeve member configured to slide with respect to the occlusion member.

The occlusion member and the sleeve member may be configured to engage one another to retain the occlusion member and the sleeve member with respect to one another. The occlusion member and the sleeve member may cooperatively engage with arms of the port to retain the retainer inside of the port. The sleeve member may be configured to abut a handle of the optoelectronic module when the sleeve member is positioned in the port. The sleeve member may be configured to at least partially surround arms of the port to retain the arms inside of indents defined by the occlusion member when the sleeve member is positioned in the port. The sleeve member may define an opening sized and shaped to receive the occlusion member.

The release mechanism may include a slider configured to move with respect to the housing. The slider may include at least one protrusion configured to engage a cage sized and shaped to receive the housing. The release mechanism may include a handle coupled to the slider to actuate the slider. The retainer may be configured to engage both the handle and the port to retain both the handle and the slider with respect to the housing. The slider may include a protrusion configured to engage a corresponding resilient tab of the cage.

The retainer may disable a release mechanism of the slider when engaged with the handle and the port. The occlusion member may include a ramp and an indent sized and shaped to receive a protrusion positioned on an arm of the port. The occlusion member may include a protrusion corresponding to a recess defined by the sleeve member. The sleeve member may include at least one retainer member configured to engage with the occlusion member to retain the sleeve member and the occlusion member with respect to one another. The sleeve member may include two resilient retainer members extending substantially parallel to one another. The retainer members may include ramp members that permit the retainer members to move through a recess defined by the sleeve member in one direction. The sleeve member may include a resilient retainer member, and the occlusion member may define an opening sized and shaped to receive the retainer member. The retainer member may include ramp members that permit the retainer member to move through the opening in one direction.

In another example, a method may include positioning an occlusion member of a retainer into a port of an optoelectronic module to occlude the port, sliding a sleeve member with respect to the occlusion member towards the port of the optoelectronic module, and cooperatively engaging the occlusion member and the sleeve member with the port to retain the retainer inside of the port.

The method may include engaging the sleeve member with the occlusion member to prevent the sleeve member from moving with respect to the occlusion member. The method may include positioning the occlusion member in between arms of the port. The method may include displacing the arms of the port away from one another by ramps of the occlusion member. The method may include positioning protrusions of arms of the port in indents defined by the occlusion member. The method may include surrounding at least a portion of the protrusions of the arms by the sleeve member, thereby retaining the protrusions in the indents by preventing the arms from moving apart. The method may include abutting the sleeve member against a portion of a handle of the optoelectronic module to retain the handle in a fixed position with respect to a housing of the optoelectronic module. The method may include disabling a release mechanism of a slider of the optoelectronic module to prevent release of the optoelectronic module from a cage.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1A:
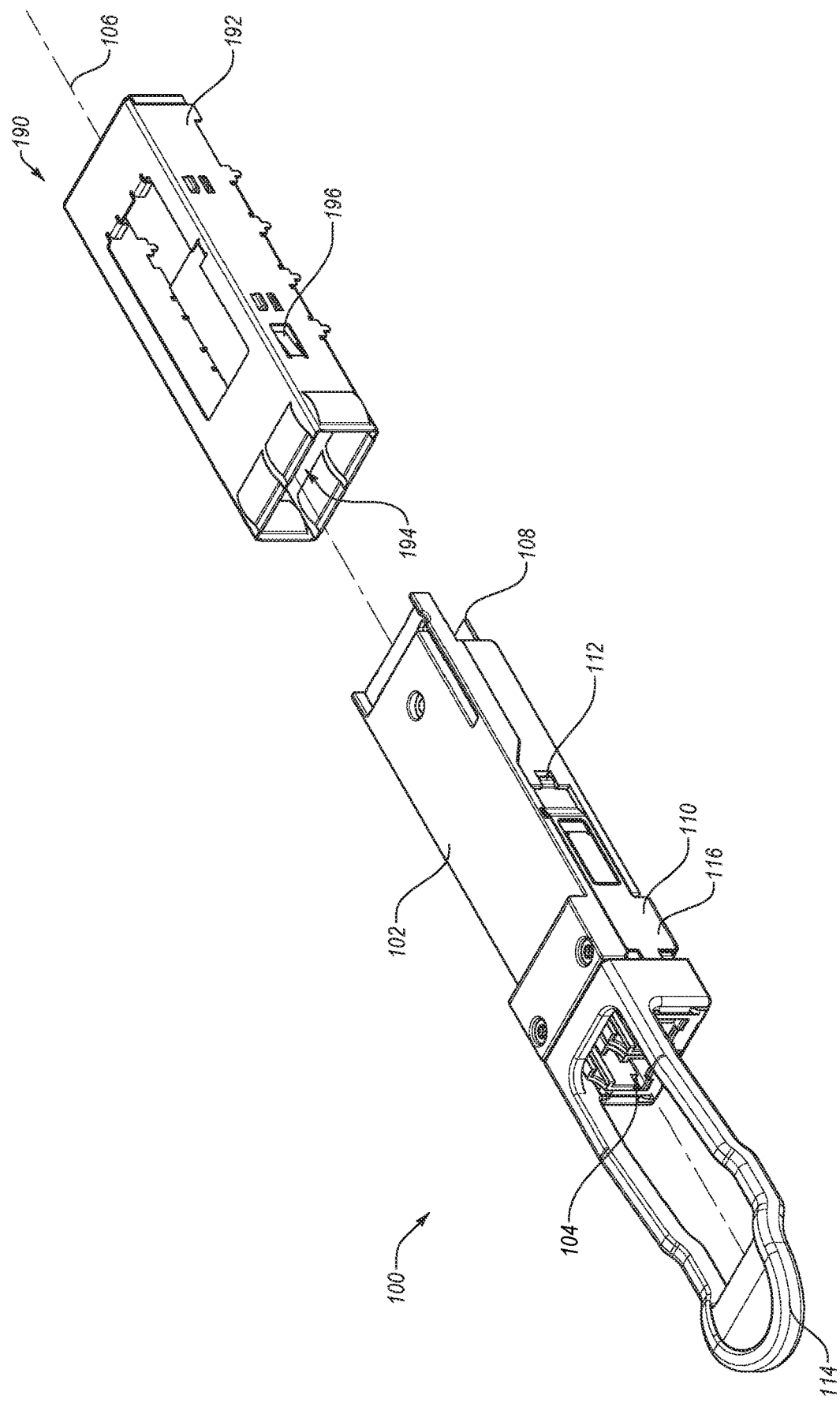
FIG. 1A is a perspective view of an optoelectronic module and a cage.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The present disclosure generally relates to retainers for optoelectronic modules, which may be implemented to prevent optoelectronic modules from unintentionally disengaging from a host device such as a network switch.

A network switch or other type of host device may be implemented to mechanically retain and communicatively couple multiple optoelectronic modules in a network. The network switch may include multiple ports or cages sized and shaped to receive optoelectronic modules. The optoelectronic modules may convert electrical signals to optical signals, or vice versa, to permit the optoelectronic modules to communicate with other network devices via optical signals. The optoelectronic modules may be communicatively coupled to the network switch, for example, to a printed circuit board assembly (PCBA) of the network switch, to permit the network switch to communicate with the other network devices.

In some configurations, the network switch and the optoelectronic modules may include a coupling mechanism such as a latch to retain the optoelectronic modules in their respective cages in the network switch. This coupling mechanism may also permit the optoelectronic modules to be removed from the cages of the network switch. However, in some circumstances, an optoelectronic module may unintentionally disengage from its cage. Accordingly, the described embodiments include retainers for optoelectronic modules, which may be implemented to prevent optoelectronic modules from unintentionally disengaging from the cages in a network switch.

Typically network switches may be shipped or distributed without optoelectronic modules positioned therein. Such configurations may be implemented, for example, to avoid damage to the optoelectronic modules during transport. However, in some circumstances it may be desirable to distribute network switches populated with optoelectronic modules. In particular, it may be desirable to ship network switches with optoelectronic modules positioned in at least some of the cages of the network switches. However, during movement associated with shipping, the optoelectronic modules may come loose or be shaken out of their respective cages. Furthermore, a release mechanism of an optoelectronic module may be unintentionally activated during shipping.

Optoelectronic modules that unintentionally disengage from their respective cages may result in damage to the optoelectronic modules or the network switch. Accordingly, the disclosed embodiments may include retainers to prevent optoelectronic modules from unintentionally releasing from the cages of the network switch, for example, during shipping. In particular, the disclosed embodiments may deactivate or disable a release mechanism of the optoelectronic module, thereby preventing the optoelectronic module from being removed from the cage of the network switch.

Figure 1B:
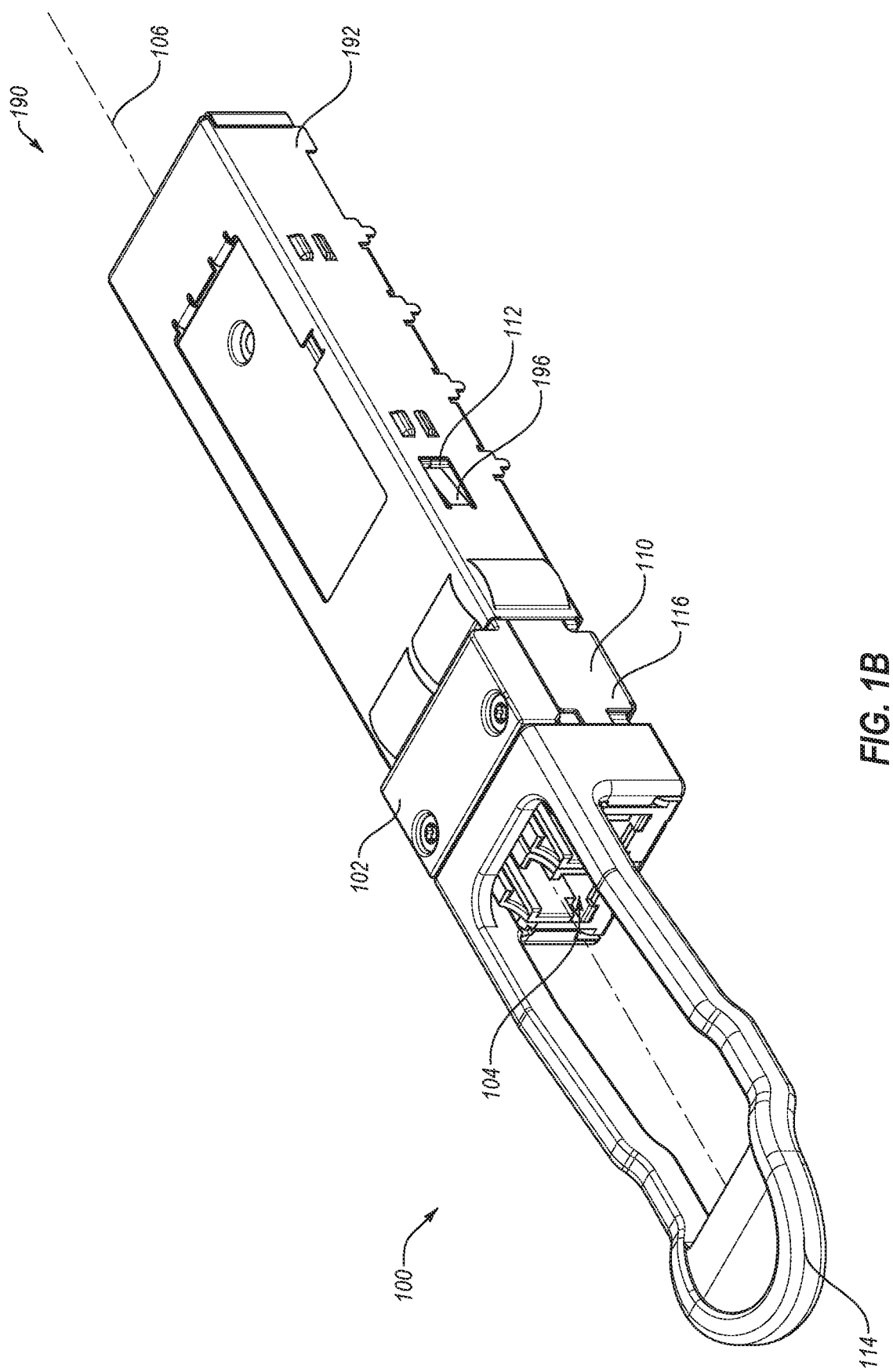
FIG. 1B is a perspective view of the optoelectronic module positioned inside of the cage.

FIGS. 1A-1B illustrate an example of an optoelectronic module 100 and a corresponding cage 190. In particular, FIG. 1A is a perspective view of the optoelectronic module 100 and the cage 190. As illustrated in FIG. 1A, the optoelectronic module 100 includes a housing 102 which may enclose optical, electrical and optoelectronic components positioned therein. For example, the optoelectronic module 100 may include optoelectronic components such optical transmitters (e.g. lasers, etc.) and optical receivers (e.g., photodiodes, etc.) to convert electrical signals to optical signals and optical signals to electrical signals. The optoelectronic module 100 may also include corresponding optics such as lenses, collimators, filters, isolators, and the like to direct and modulate optical signals travelling to and from the optoelectronic components. The optoelectronic module 100 may include any suitable electrical components, such as drivers to drive the optical transmitters, amplifiers to amplify signals from the optical receivers, controllers to control the operation of the optoelectronic module 100 and the like. The above-mentioned optoelectronic, optical, and electrical components may be at least partially enclosed in a housing.

As illustrated, the optoelectronic module 100 may include one or more ports 104 to mechanically and optically couple the optoelectronic module 100 to optical fibers. The port 104 may be sized and shaped to receive a connector of the optical fiber, such as ferrule or other suitable coupler. In the illustrated configuration, the optoelectronic module 100 includes one port 104, although any suitable configuration may be implemented. In the illustrated configuration, the optoelectronic module 100 extends along a longitudinal axis 106 and the optical fiber(s) may be inserted into the port 104 in a direction parallel to the longitudinal axis 106.

When optical fibers are coupled to the optoelectronic module 100, the optoelectronic module 100 may send and receive optical signals with other components in a network. The optoelectronic module 100 may include an electrical coupling 108 such as an edge connector to electrically couple the optoelectronic module 100 to a host device. Accordingly, the optoelectronic module 100 may permit the host device to communicate with other components in the network by converting electrical signals to optical signals to be transmitted to the other components in the network, and converting received optical signals to electrical signals to be used by the host device.

The cage 190 may include a body 192 defining an opening 194 sized and shaped to receive the optoelectronic module 100 (or the housing 102 of the optoelectronic module 100). The cage 190 may be included in a host device to mechanically and electrically couple the optoelectronic module 100. In particular, the cage 190 may receive and retain the optoelectronic module 100 in the opening 194. Furthermore, the host device may include an electrical coupling such as a socket that corresponds to the electrical coupling 108 of the optoelectronic module 100. The socket may receive the edge connector of the optoelectronic module 100 to electrically couple the optoelectronic module 100 to the host device.

Although the illustrated configuration includes one cage 190, the host device may include any suitable number of cages to interface with multiple optoelectronic modules. For example, if the host device is a fiber optic network switch, it may include configurations of 4, 8, 12, 24, 32, 48, 64 ports or any other suitable number of ports and corresponding optoelectronic modules.

The optoelectronic module 100 and the cage 190 may include a coupling mechanism to retain the optoelectronic module 100 with respect to the cage 190. In particular the cage 109 may include resilient tabs 196 and the optoelectronic module 100 may include a slider 116 with arms 110 configured to engage with the tabs 196 of the cage 190 to prevent removal of the optoelectronic module 100 from the cage 190. In particular, the arms 110 may include protrusions 112 that engage the tabs 196 of the cage 190 thereby preventing movement of the optoelectronic module 100, for example, in a direction parallel to the longitudinal axis 106. The slider 116 and the arms 110 may move with respect to the housing 102 of the optoelectronic module 100, in a direction parallel to the longitudinal axis 106, to engage or disengage the protrusions 112 with respect to the tabs 196. As shown, the arms 110 extend along the housing 102 in a direction parallel to the longitudinal axis 106.

The optoelectronic module 100 may include a handle 114 coupled to the slider 116 to permit a user to move the slider 116 in a direction parallel to the longitudinal axis 106 to engage or disengage the optoelectronic module 100 with respect to the cage 190. In the illustrated configuration, the handle 114 extends in a direction parallel to the longitudinal axis 106 and is sized and shaped to be grasped or otherwise manipulated by the user.

FIG. 1B is a perspective view of the optoelectronic module 100 positioned inside of the cage 190. The optoelectronic module 100 may be inserted in the opening 194 and slid into the cage 190 until the housing 102 abuts the cage 190. Once the optoelectronic module 100 is positioned in the cage 190, the protrusions 112 may engage the tabs 196 to prevent the optoelectronic module 100 from being removed from the cage 190, as shown. Since the tabs 196 are resilient, they may be displaced by the protrusions 112 as the optoelectronic module 100 is inserted into the cage 190, until the protrusions 112 move beyond and abut the ends of the tabs 196, in the engaged position shown.

Figure 1C:
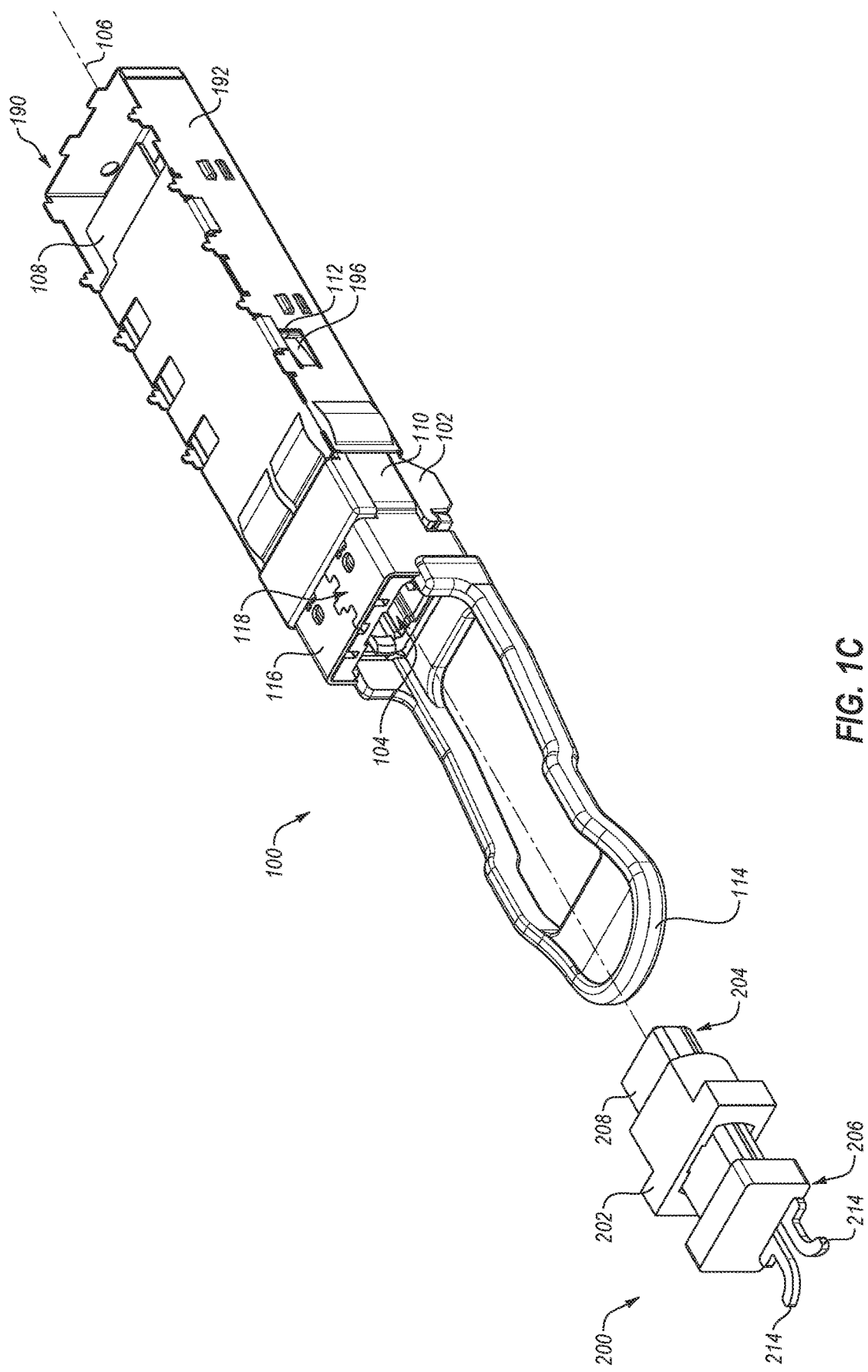
FIG. 1C is another perspective view of the optoelectronic module positioned inside of the cage with a retainer.

FIG. 1C is another perspective view of the optoelectronic module 100 positioned inside of the cage 190. In addition, FIG. 1C illustrates a retainer 200. The retainer 200 may be implemented to prevent the optoelectronic module 100 from unintentionally disengaging from the cage 190. In the illustrated configuration, the retainer 200 may also be configured as a plug. Accordingly, the retainer 200 may be a combined retainer and plug for the optoelectronic module 100. In such configurations, the retainer 200 may be sized and shaped to be positioned in the port 104. The retainer 200 may occlude the port 104 to prevent contaminants such as dust and material from entering the port 104, for example, during transport, shipping or otherwise when the optoelectronic module 100 is not in use and is not coupled to optical fibers. Thus, the retainer 200 may avoid damage to the optoelectronic module 100 during transport.

As will be described in further detail below, the retainer 200 may be configured to deactivate or disable a release mechanism of the optoelectronic module 100, thereby preventing the optoelectronic module 100 from unintentionally releasing from the cage 190. Such configuration may permit network switches to be shipped with optoelectronic modules positioned in the cages, without the optoelectronic modules coming loose of their respective cages. Accordingly, the retainer 200 may prevent damage to the optoelectronic module 100 or the network switch during shipping.

As explained above, the slider 116 may move with respect to the housing 102 of the optoelectronic module 100 in a direction parallel to the longitudinal axis 106 to engage or disengage the protrusions 112 with respect to the tabs 196. Furthermore, the handle 114 is coupled to the slider 116 to permit a user to move the slider 116 in a direction parallel to the longitudinal axis 106 to engage or disengage the optoelectronic module 100 with respect to the cage 190. In the position shown in FIG. 1C, the slider 116 is in an engaged or locked position, with the slider 116 positioned towards the electrical coupling 108 along the longitudinal axis 106. In this position, the handle 114 is also positioned towards the electrical coupling 108, with the handle 114 abutting the housing 102, for example, as shown in FIG. 1B.

In a disengaged or unlocked position, the slider 116 may be positioned further from the electrical coupling 108 along the longitudinal axis 106. In this position, the protrusions 112 of the slider 116 may disengage the tabs 196 of the cage 190 to permit the optoelectronic module 100 to be removed from the cage 190. In particular, the protrusions 112 may displace the tabs 196 in a direction away from the optoelectronic module 100, permitting the slider 116 and the protrusions 112 to move past the tabs 196, for example, to permit the optoelectronic module 100 to be removed from the cage 190. A user may move the slider 116 to the disengaged or unlocked position by pulling on the handle 114, which is coupled to the slider 116. Thus, when a user pulls on the handle 114, the slider 116 may be moved to the disengaged or unlocked position, thereby permitting the protrusions 112 of the slider 116 to move past the tabs 196.

The slider 116 may not move beyond the disengaged or unlocked position, so when the user continues to pull on the handle 114, the entire optoelectronic module 100 will be pulled along with the handle 114, thereby pulling the optoelectronic module 100 from the cage 190. In practice, when the user pulls on the handle 114 the optoelectronic module 100 may be removed from the cage 190 in a continuous motion, with the slider 116 first being pulled into the disengaged or unlocked position and then the optoelectronic module 100 being pulled from the cage 190.

The retainer 200 may be configured to prevent the slider 116 (and the handle 114) from being moved with respect to the housing 102 or the rest of the optoelectronic module 100 (e.g., in the longitudinal direction) to the disengaged or unlocked position. This in turn prevents the optoelectronic module 100 from being removed from the cage, and from unintentional release from the cage 190.

As shown in FIG. 1C, the retainer 200 may include an occlusion member 208 that extends between a first end portion 204 and a second end portion 206. As explained above, the retainer 200 may occlude the port 104. Accordingly, the occlusion member 208 may be sized and shaped to be positioned inside of the port 104. In particular, the first end portion 204 of the occlusion member 208 may be sized and shaped to be received in the port 104. The retainer 200 may include a sleeve member 202 that is configured to move with respect to occlusion member 208. In the illustrated configuration, the sleeve member 202 fully surrounds the occlusion member 208, although configurations where the sleeve member 202 partially surrounds the occlusion member 208 may be implemented. The occlusion member 208 and the sleeve member 202 may be moved (e.g., slid) with respect to one another. Thus, the occlusion member 208 and the sleeve member 202 may be slidingly engaged or slidingly coupled with respect to one another. Additionally or alternatively, the sleeve member 202 may define an opening sized and shaped to receive the occlusion member 208 (see, e.g., FIG. 2A).

The sleeve member 202 may include retainer members 214 configured to engage with the occlusion member 208 to retain the sleeve member and the occlusion member 208 with respect to one another, as will be described in further detail below. The retainer members 214 may be sized and shaped to be manipulated by a user to engage and disengage the sleeve member 202 and the occlusion member 208. As shown, the retainer members 214 may extend substantially parallel to one another towards the second end portion 206 of the occlusion member 208.

In the illustrated configuration, the retainer 200 includes one occlusion member 208 corresponding to the port 104. However, the retainer 200 may include more than one occlusion members, depending on the number of ports included in the optoelectronic module 100. In addition to being sized and shaped to be positioned in the port 104, if more than one occlusion members are included, they may be spaced apart from one another a distance that correspond to a distance between ports.

The retainer 200 may be formed of a resilient material (such as a resilient plastic or polymer material). Such configurations may permit the retainer members 214 to be deformed towards the interior of the retainer 200, to permit the sleeve member 202 to engage and disengage with the occlusion member 208, which in turn will permit the retainer 200 to engage and disengage with the port 104 of the optoelectronic module 100. Once positioned to engage the optoelectronic module 100, the retainer members 214 may return to their original position as the retainer members 214 retain the sleeve member 202 and the occlusion member 208 with respect to one another. Further, this position retains the retainer 200 in an engaged or locked position with respect to the port 104. To disengage or unlock the retainer 200 with respect to the housing 102, the retainer members 214 may be displaced inwardly, which may disengage the sleeve member 202 from the occlusion member 208, thereby permitting the retainer 200 to be disengaged from the port 104 of the optoelectronic module 100. Aspects of engaging and disengaging the retainer 200 will be described in further detail below.

Figure 1D:
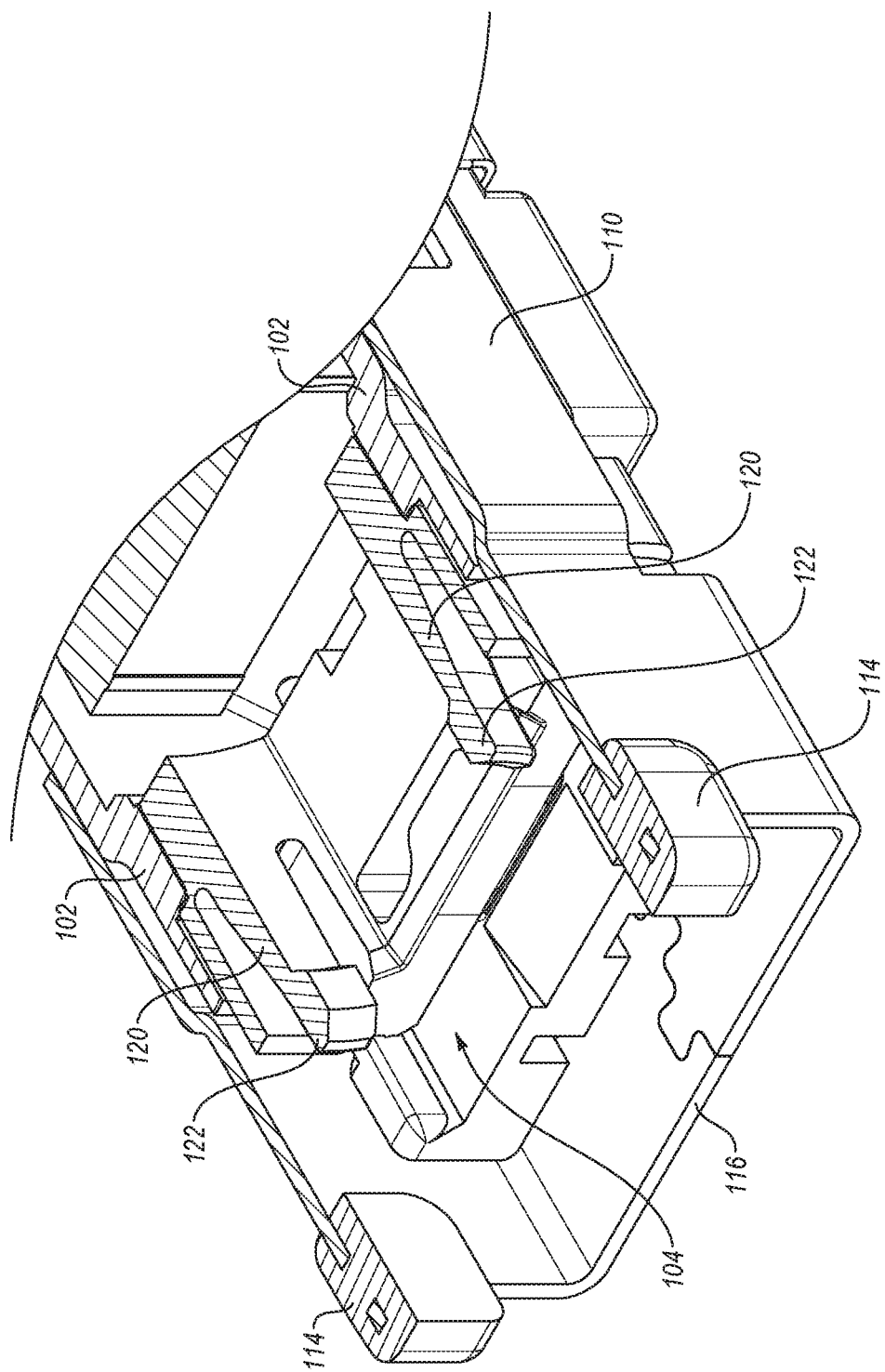
FIG. 1D is a section view of a portion of the optoelectronic module.

FIG. 1D is a section view of a portion of the optoelectronic module 100 to illustrate the port 104 in further detail. As shown, the port 104 may include arms 120 extending outwardly from the port 104. The arms 120 may include protrusions 122. The arms 120 and the protrusions 122 may be configured to engage with and retain a connector for optical fibers. In the such configurations, the protrusions 122 may engage with the optical fiber connector to retain the optical fiber connector in the port 104, for example, as the optoelectronic module 100 operates to communicate optical signals through the optical fibers. As shown, the protrusions 122 include ramps on both sides to permit the arms 120 to be displaced outward as the optical fiber connector is positioned in the port 104 or as the optical fiber connector is removed from the port 104. Accordingly, the arms 120 may be formed of a resilient material to permit the arms to be displaced (e.g., by the optical fiber connector) and return to their original position.

Although the port 104 of the optoelectronic module 100 is configured to receive and engage with an optical fiber connector, the retainer 200 may also be positioned in and engaged with the port 104. In particular, the retainer 200 may be engaged with the port 104 when the optoelectronic module 100 is not operating, for example, during shipping or transport. The retainer 200 may occlude the port 104 to protect the port 104 and interior components of the optoelectronic module 100 from dust and other contaminants which may damage the optoelectronic module 100. The retainer 200 may also disable a release mechanism of the optoelectronic module 100, thereby retaining the optoelectronic module 100 engaged with the cage 190. Such aspects will be described in further detail below.

Figure 2A:
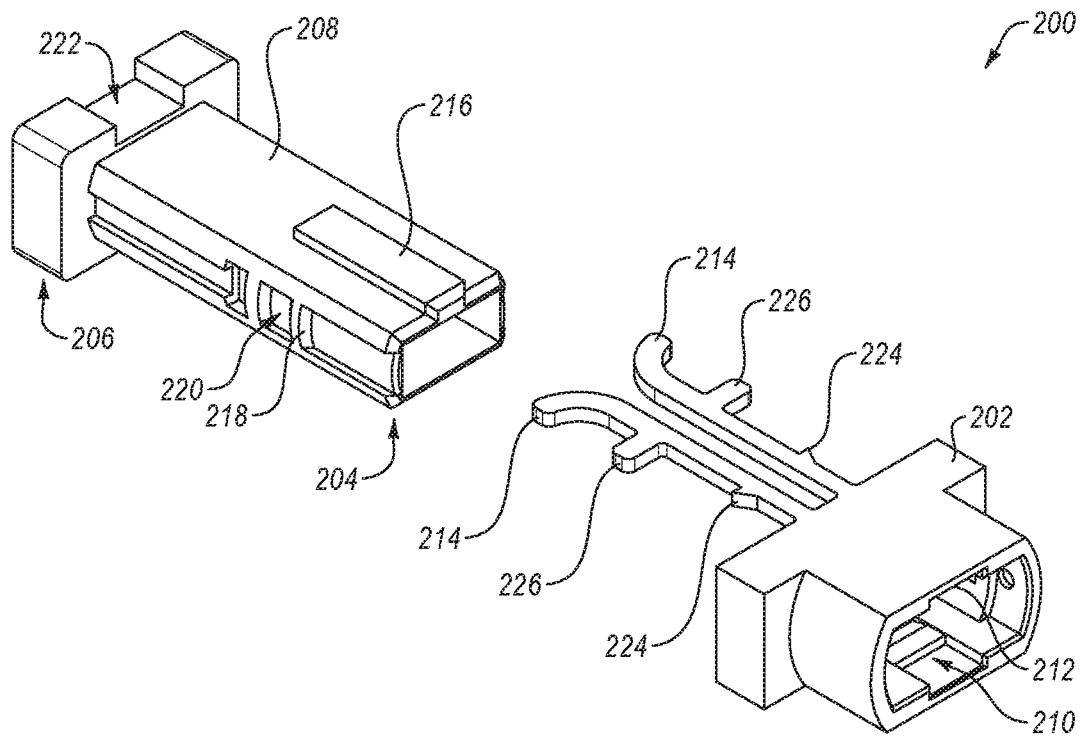
FIGS. 2A-2B are perspective views of the retainer of FIG. 1C.
Figure 2B:
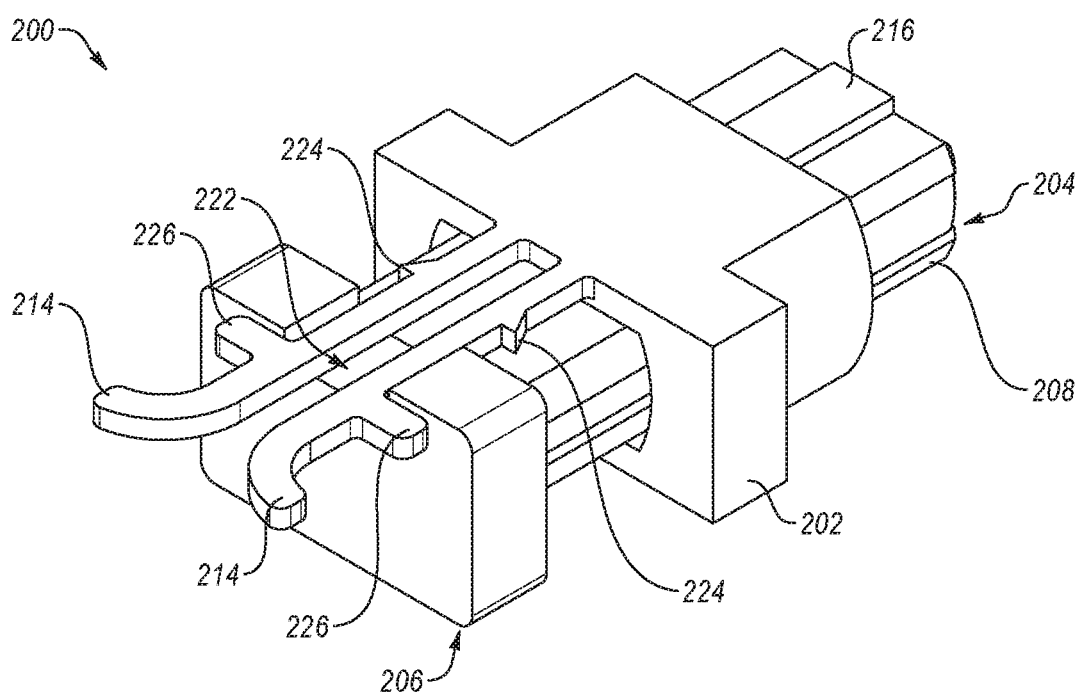

FIGS. 2A and 2B are perspective views of the retainer 200. In particular, FIG. 2A is a perspective view of the retainer 200 with the occlusion member 208 separate from the sleeve member 202 and FIG. 2B is a view of the retainer 200 with the occlusion member 208 coupled to the sleeve member 202. With attention to FIGS. 2A-2B, the retainer 200 will be described in further detail.

As mentioned above, the occlusion member 208 and the sleeve member 202 may be configured to be moved or slid with respect to one another. Accordingly, the sleeve member 202 defines and opening 210 sized and shaped to receive the occlusion member 208, as shown in FIG. 2A. The occlusion member 208 may be positioned inside of the opening 210, as shown in FIG. 2B, and moved with respect to the sleeve member 202.

The sleeve member 202 may define a recess 212, which may be positioned inside of the opening 210. The occlusion member 208 may include a protrusion 216 that corresponds to the recess 212. The protrusion 216 may be sized and shaped to mate with the recess 212. The protrusion 216 and the recess 212 may cooperate to guide the sliding or movement of the sleeve member 202 with respect to the occlusion member 208. In the illustrated configuration, the protrusion 216 is elongated, rectangular, and offset with respect to the body of the occlusion member 208, and the recess 212 has a shape corresponding to the cross-section of the protrusion 216. Further, the recess 212 and the protrusion 216 may be positioned on one side of the sleeve member 202 and the occlusion member 208. Such configurations may ensure that the occlusion member 208 is inserted in the opening 210 in the correct direction (e.g., not upside down). However, other configurations may be implemented and in some circumstances the recess 212 and the protrusion 216 may not be included.

As mentioned above, the occlusion member 208 may be sized and shaped to be positioned in the port 104. Furthermore, the occlusion member 208 may be configured to engage or disengage with the port 104. In the example illustrated in FIG. 2A, the occlusion member 208 includes a ramp 218 and an indent 220. As illustrated, the ramp 218 and the indent 220 are positioned proximate to one another and on the sides of the occlusion member 208 and positioned to engage with the arms 120 of the port 104. In particular, the indent 220 is sized and shaped to receive the protrusions 122 of the arms 120, thereby engaging the port 104 with the occlusion member 208.

The ramp 218 may displace the arms 120 as the occlusion member 208 is positioned in the port 104. Once the occlusion member 208 is positioned further in the port 104, the protrusions 122 may clear the ramp 218 and may be positioned in the indent 220, thereby engaging the occlusion member 208 and the port 104. In configurations where the arms 120 are resilient, the resilience of the arms 120 may retain the protrusions 122 in the indent 220. Additionally or alternatively, the ramp 218 may contribute to preventing the protrusions 122 from being removed from the indent 220. For example, the ramp 218 may include a surface or stop that may prevent the protrusions 122 from disengaging the indent 220 (e.g., if the occlusion member 208 is being pulled out of the port 104).

Although FIG. 2A shows only one side of the occlusion member 208, the occlusion member 208 may include a second ramp and second indent positioned on the other side of the occlusion member 208, to correspond to the other one of the arms 120 of the port 104. In such configurations, the second ramp and second indent may include mirrored configurations of the ramp 218 and the indent 220 shown. In some circumstances, the size and shape of occlusion member 208 may correspond to a standardized connector type, although other configurations may be implemented. Furthermore, other features may be implemented to engage or disengage with the port 104 according to the concepts described herein.

As mentioned above, the sleeve member 202 may include retainer members 214 configured to engage with the occlusion member 208 to retain the sleeve member and the occlusion member 208 with respect to one another. FIGS. 2A and 2B illustrate the retainer members 214 in further detail. The retainer members 214 may be formed of a resilient material to permit the retainer members 214 to be displaced and then return to their original position. As shown, the retainer members 214 may be sized and shaped to be manipulated by a user. For example, ends of the retainer members 214 may be grasped or otherwise manipulated to permit a user to displace the retainer members 214 towards one another. Once the retainer members 214 are released by the user, the resilience of the retainer members 214 may return them to their original position (e.g., further apart from one another.

As shown, for example, in FIG. 2A, the occlusion member 208 may define a recess 222 sized and shaped to receive the retainer members 214. Further, the recess 222 may permit the retainer members 214 to move with respect to the occlusion member 208 as the sleeve member 202 moves with respect to the occlusion member 208. The retainer members 214 may move or slide through the recess 222 as the occlusion member 208 moves with respect the sleeve member 202, for example, as shown in FIG. 2B.

The retainer members 214 may include ramp members 224 and stop members 226. The stop members 226 may restrict the movement of the occlusion member 208 and the sleeve member 202. In particular, the stop members 226 may prevent the retainer members 214 to move through the recess 222 beyond a specified distance. The ramp members 224 may permit the retainer members 214 to move through the recess 222 of the sleeve member 202 in one direction, but not another. Accordingly, the ramp members 224 may retain the occlusion member 208 and the sleeve member 202 with respect to one another, at least to prevent movement in one direction. Such aspects will be described in further detail below.

FIGS. 3A-3D are perspective views of a portion of the optoelectronic module 100 and the retainer 200, and FIGS. 3E-3H are section views of a portion of the optoelectronic module 100 and the retainer 200. With attention to FIGS. 3A-3H, engaging and disengaging the retainer 200 and the optoelectronic module 100 will be described in further detail.

Figure 3A:
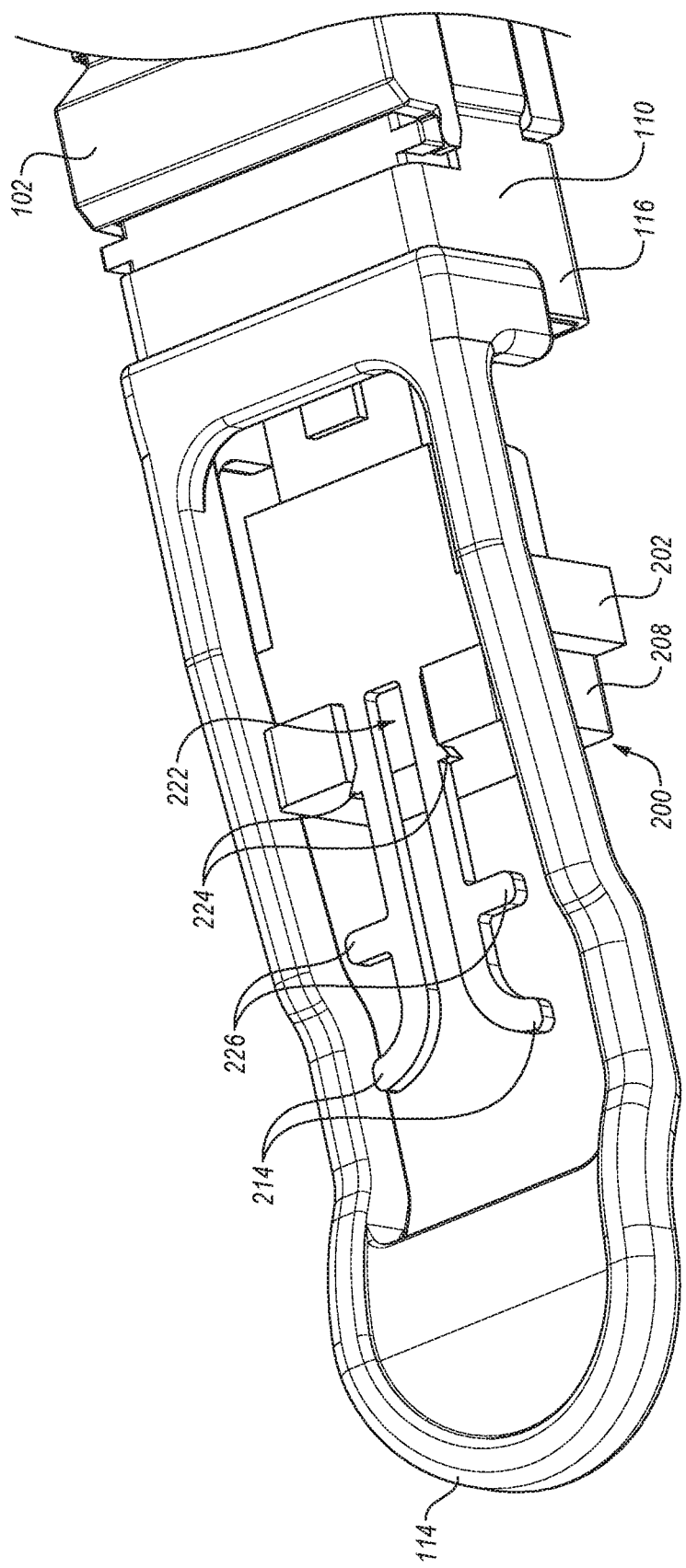
FIGS. 3A-3D are perspective views of a portion of the optoelectronic module and the retainer.
Figure 3B:
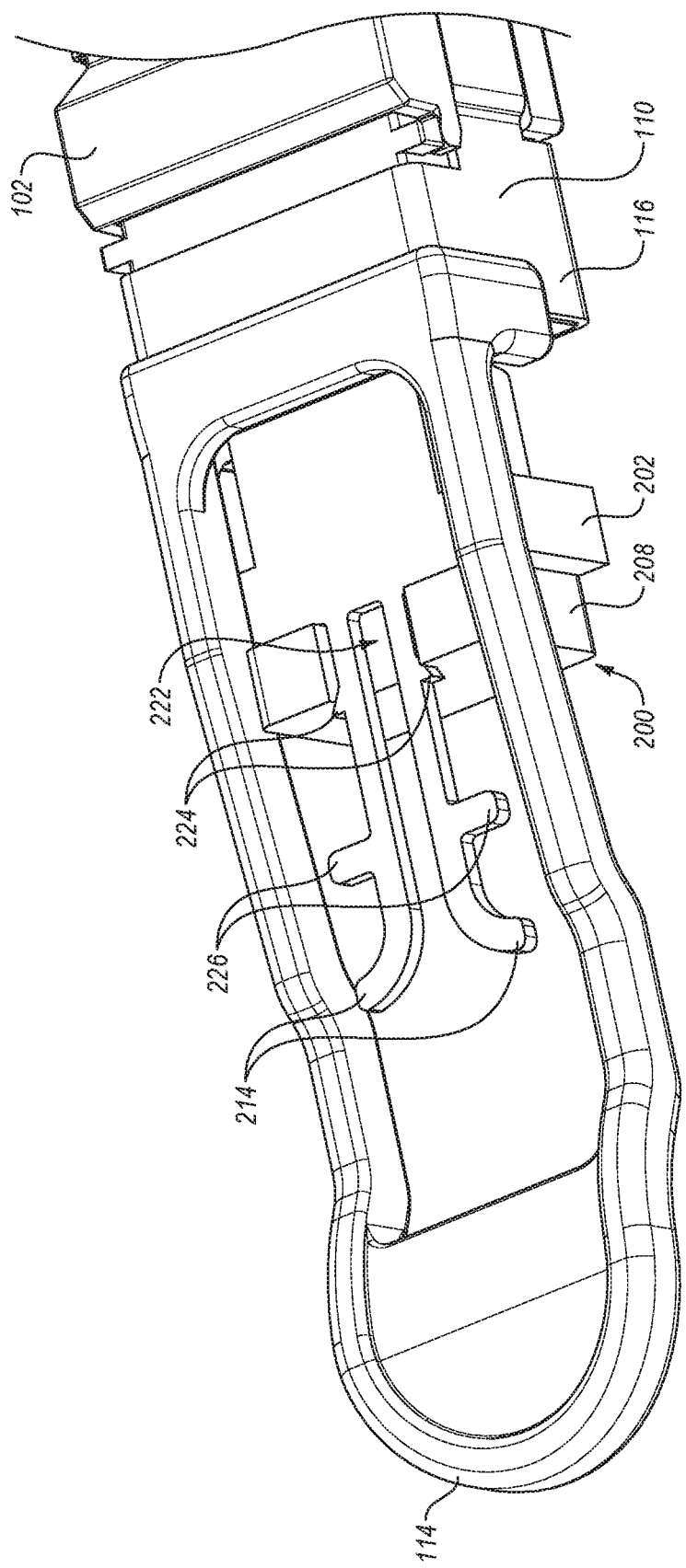

As shown in FIG. 3A, engaging the retainer 200 may begin by positioning the occlusion member 208 in the port 104 of the optoelectronic module 100. In particular, the first end portion 204 of the occlusion member 208 may be positioned in the port 104. FIG. 3B illustrates the occlusion member 208 positioned further in the port 104. In this position the occlusion member 208 may occlude the port 104 and abut the interior of the port 104 such that occlusion member 208 cannot be positioned further in the port 104. In the position shown in FIG. 3B, the sleeve member 202 is positioned outside of the port 104, in a position furthest away from the optoelectronic module 100.

Figure 3C:
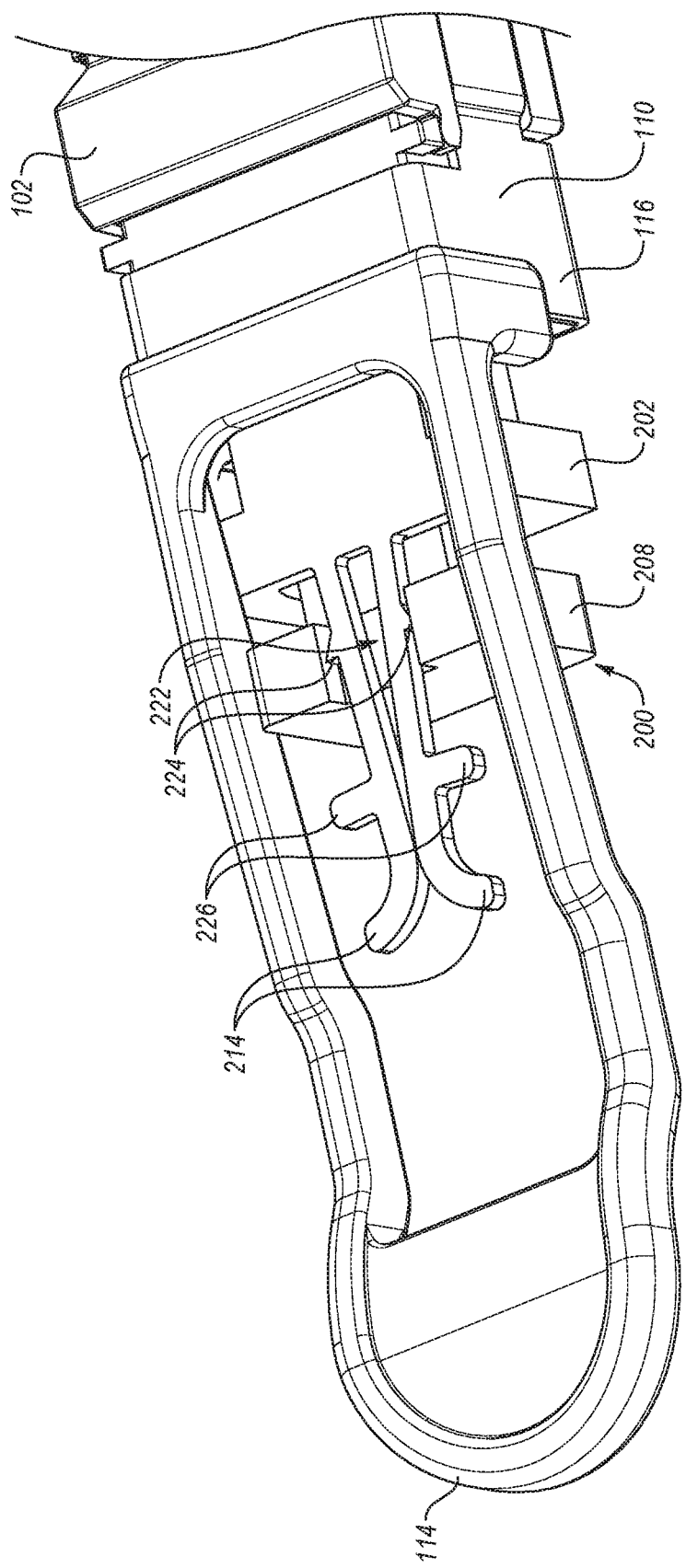

Once the occlusion member 208 is positioned fully inside of the port 104 (e.g., to abut the end of the port 104), the sleeve member 202 may be displaced towards the optoelectronic module 100, or displaced at least partially inside of the port 104. FIG. 3C illustrates the sleeve member 202 being displaced towards the optoelectronic module 100. The sleeve member 202 may be displaced, for example, by a user pushing on the ends of the retainer members 214 in a direction toward the port 104 or the optoelectronic module 100. As shown, as the sleeve member 202 moves towards the port 104, the ramp members 224 displace the retainer members 214 towards one another. In particular, the ramp members 224 push the retainer members 214 towards one another as the sleeve member 202 moves through the recess 222 towards the port 104. Thus, ramp surfaces of the ramp members 224 abut against walls defining the recess 222 to push the retainer members 214 towards one another. Additionally or alternatively, the user may displace the retainer members 214 towards one another, for example, by grasping the retainer members 214 towards one another, as the user moves the sleeve member 202 towards the port 104. In such circumstances, the retainer members 214 may move unobstructed through the recess 222.

Figure 3D:
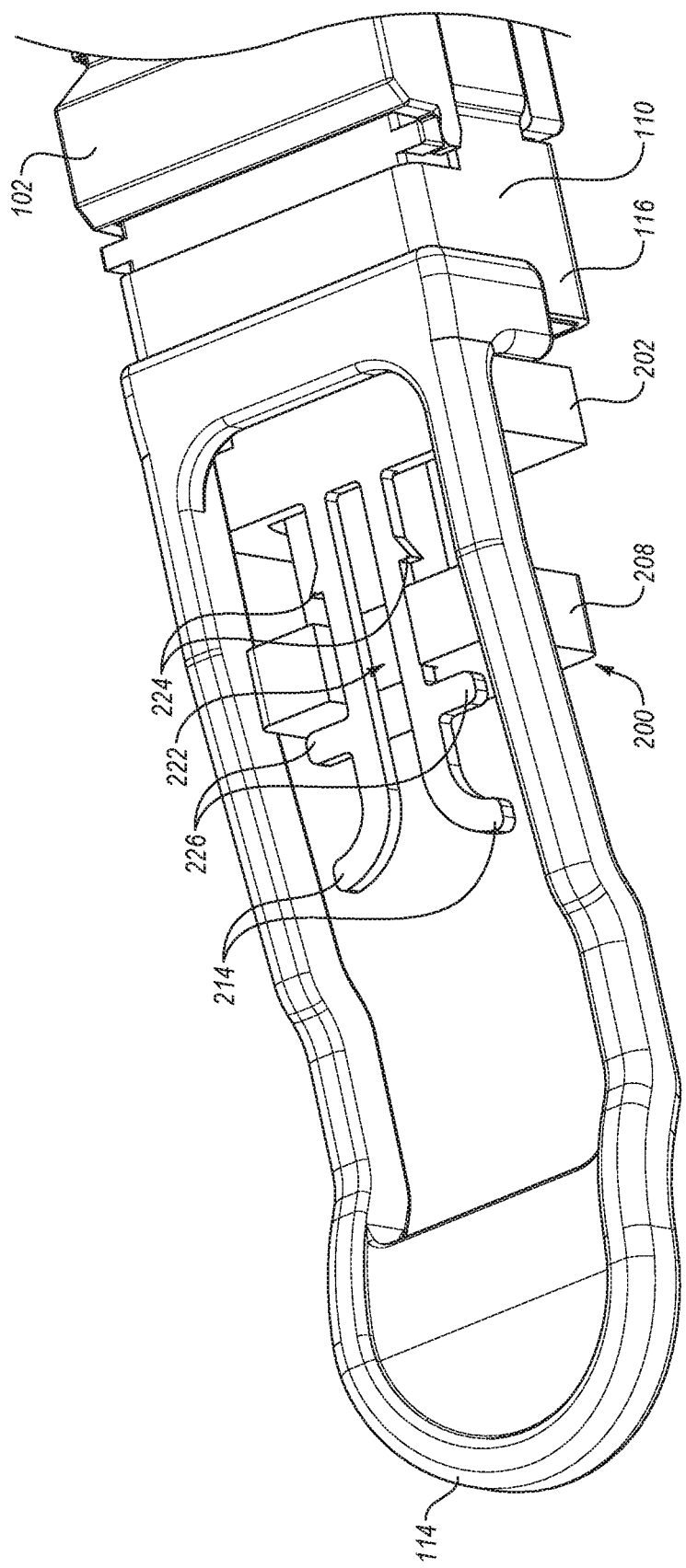

FIG. 3D illustrates the sleeve member 202 positioned further towards the port 104. As shown, once the ramp members 224 move past or clear the recess 222, the retainer members 214 may spread apart from one another and return to their original position (e.g., by virtue of the resilience of the retainer members 214). In this position, surfaces of the ramp members 224 abut the occlusion member 208, thereby preventing the sleeve member 202 from moving with respect to the occlusion member 208 in a direction away from the port 104.

FIGS. 3E-3H are section views of a portion of the optoelectronic module 100 and the retainer 200 to further illustrate the retainer 200 engaging with the port 104. In general, FIGS. 3E-3H illustrate corresponding positions of the retainer 200 and the optoelectronic module 100 as shown in FIGS. 3A-3D, respectively.

Figure 3E:
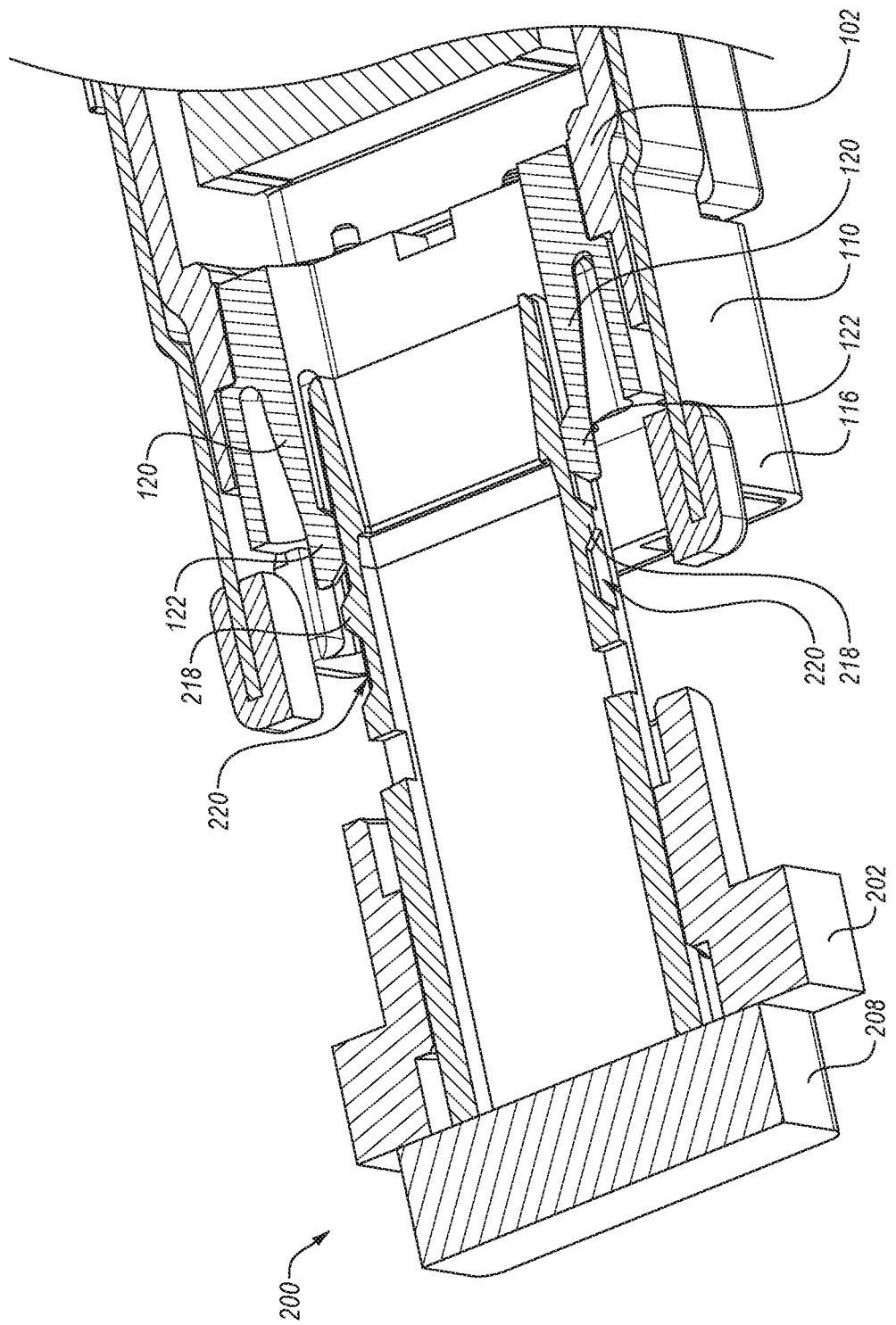
FIGS. 3E-3H are section views of a portion of the optoelectronic module and the retainer.
Figure 3F:
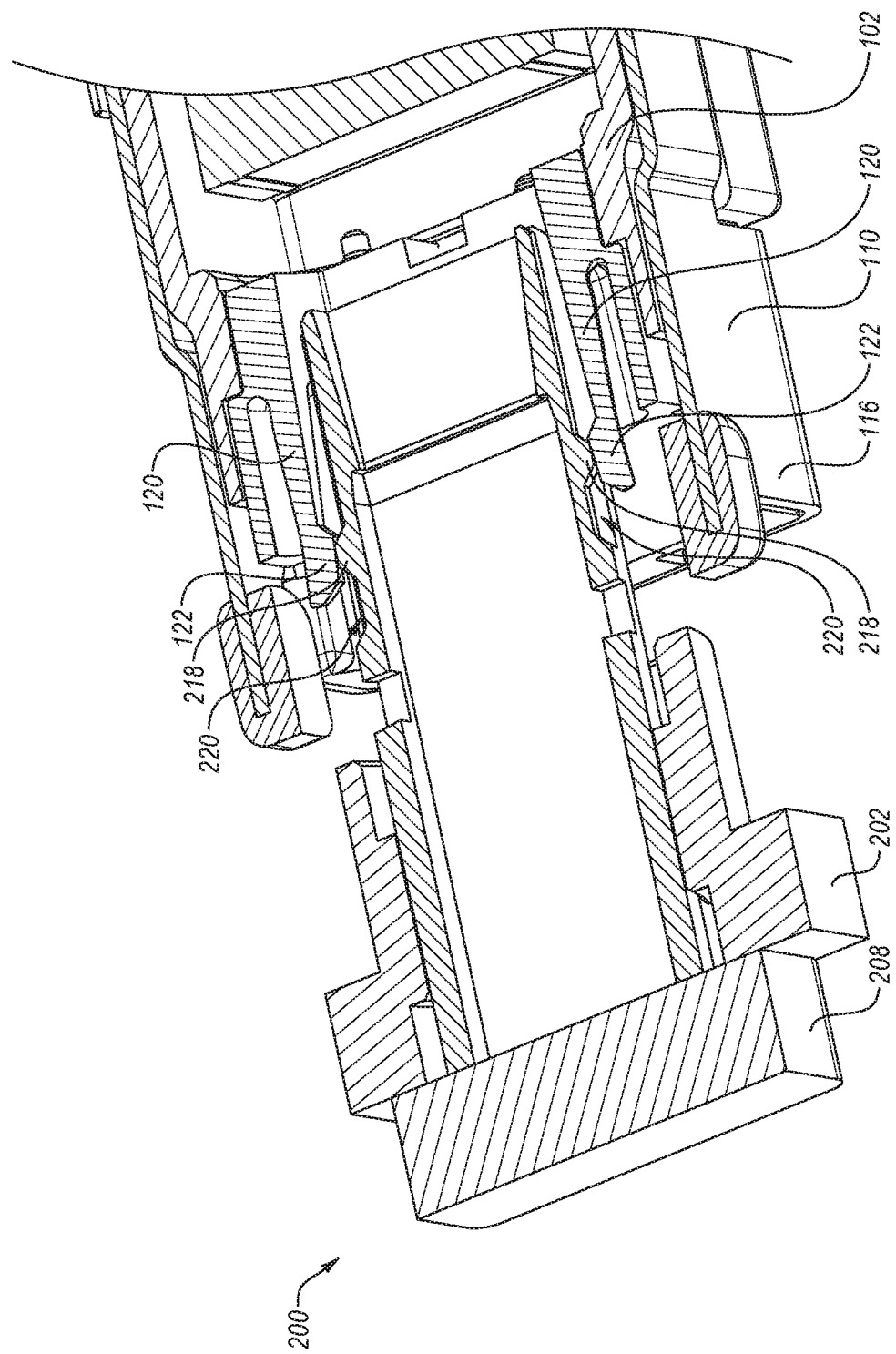

As shown in FIG. 3E, as the occlusion member 208 of the retainer 200 is positioned in the port 104, the arms 120 move along the sides of the occlusion member 208 until the protrusions 122 abut the ramps 218 of the occlusion member 208. As shown in FIG. 3F, once the protrusions 122 encounter the ramps 218 of the occlusion member 208, the ramps 218 displace the arms 120 away from one another, thereby permitting the occlusion member 208 to be positioned further into the port 104. As shown, the protrusions 122 include ramped surfaces that correspond to the ramps 218, thereby permitting the protrusions 122 to move along the ramps 218. With the arms 120 spread apart, the protrusions 122 may move past the ramps 218 and into the indents 220, for example, as shown in FIG. 3G.

Figure 3G:
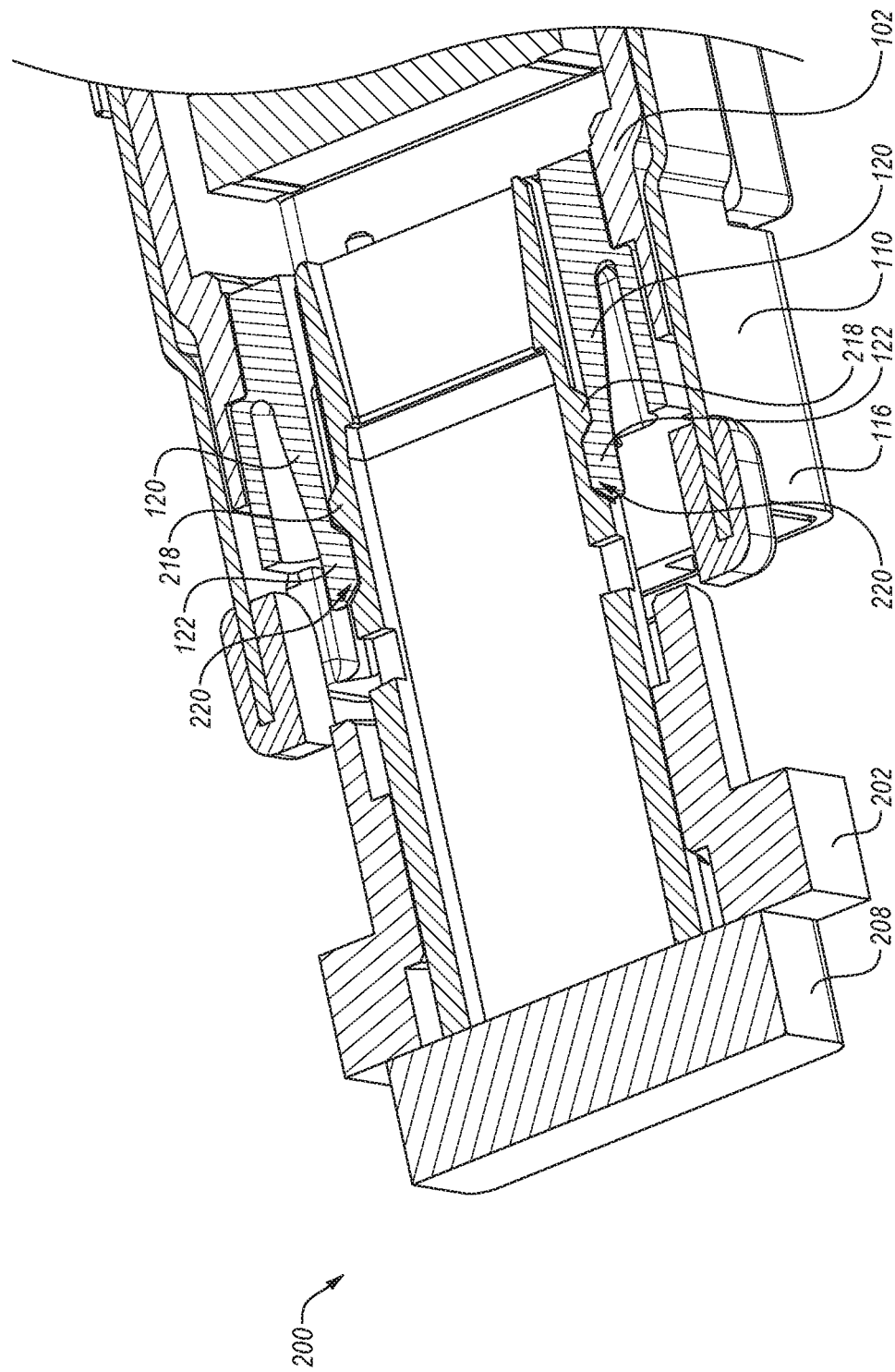

FIG. 3G illustrates the occlusion member 208 positioned fully in the port 104, for example, to abut the end of the port 104. In this position, the protrusions 122 may be positioned in the indents 220. As shown, the protrusions 122 are sized and shaped to correspond to the indents 220, and thus include complimentary shapes. Since the arms 120 are formed of a resilient material, the arms 120 urge the protrusions 122 into the indents 220 as the arms 120 return to their original position.

Figure 3H:
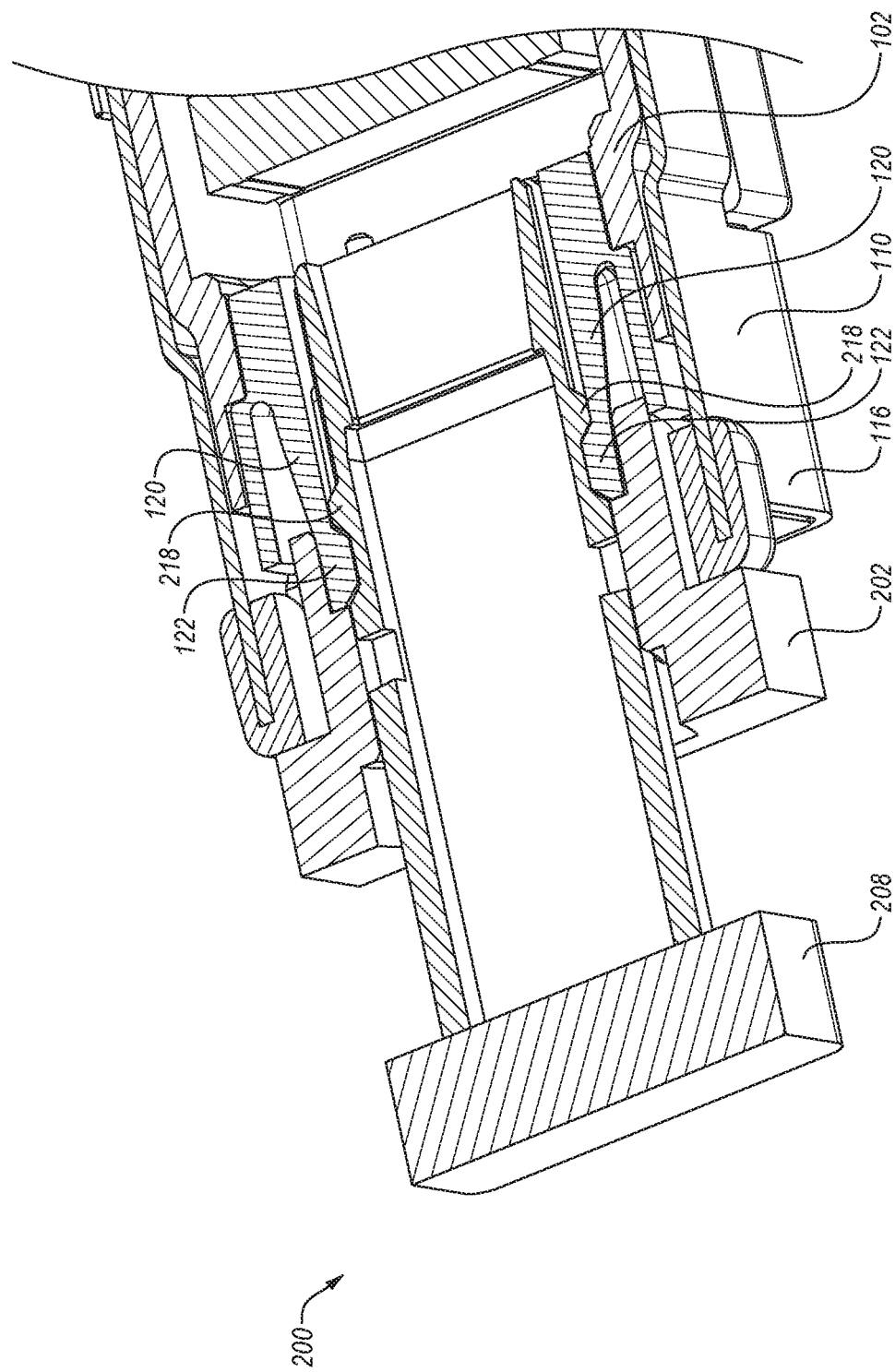

FIG. 3H illustrates the sleeve member 202 positioned further towards the port 104. As shown, once the sleeve member 202 is positioned further into the port 104, the sleeve member 202 surrounds at least a portion of the protrusions 122, thereby retaining the protrusions 122 in the indents 220 by preventing the arms 120 from moving apart. In the illustrated position, the occlusion member 208 is engaged with the port 104, and the sleeve member 202 prevents the occlusion member 208 from disengaging from the port 104. Thus, the occlusion member 208 and the sleeve member 202 cooperatively engage with the arms 120 of the port 104 to retain the retainer 200 inside of the port 104. Furthermore, as shown in FIG. 3D, the sleeve member 202 is also engaged with the occlusion member 208, thereby preventing the sleeve member 202 from moving with respect to the occlusion member 208. In this position, the sleeve member 202, the occlusion member 208 and the port 104 are fixed with respect to one another.

Furthermore, the sleeve member 202 of the retainer 200 abuts a portion of the handle 114 to retain both the handle 114 and the slider 116 in a fixed position (e.g., the engaged or locked position) with respect to the housing 102. Thus, the retainer 200 is engaged with the port 104 and prevents the handle 114 and the slider 116 from moving with respect to the housing 102 in a direction parallel to the longitudinal axis 106 to the disengaged or unlocked position (e.g., in a direction away from the electrical coupling 108). Thus, the retainer 200 is fixed with respect to both the port 104, the housing 102 and the handle 114.

Since the handle 114 is coupled to the slider 116, the retainer 200 also retains the slider 116 with respect to the housing 102. This in turn prevents the slider 116 from moving with respect to the housing 102 to deactivate or disable the release mechanism of the slider 116, thereby preventing release of the optoelectronic module 100 from the cage 190.

To remove or disengage the retainer 200 from the optoelectronic module 100, the retainer members 214 may be displaced towards one another (e.g., by a user), which in turn permits the ramp members 224 to clear the surfaces defining the recess 222, for example, as shown in FIG. 3D. The retainer members 214 may be configured to release the ramp members 224 from the recess 222 when the retainer members 214 are disposed toward one another. With the ramp members 224 clear of the recess 222, the sleeve member 202 may move with respect to the occlusion member 208, for example, in a direction away from the port 104. Thus, the user may continue to grasp the ends of the retainer members 214 and pull the sleeve member 202 away from the port 104.

As the sleeve member 202 moves away from the port 104, it no longer surrounds or abuts the protrusions 122 of the arms 110 inside of the port 104 (as shown in FIGS. 3H and 3G). This in turn permits the arms 110 to spread apart and also permits the protrusions 122 to be removed from the indents 220. Once the arms 110 are able to spread apart unobstructed, the occlusion member 208 may be removed from the port 104, for example, as shown in FIGS. 3F and 3E. As the user continues to pull the sleeve member 202 away from the port 104, the sleeve member 202 may eventually abut the occlusion member 208, for example, as shown in FIG. 3B. If the user continues to pull on the sleeve member 202, the user will pull the occlusion member 208 out of the port 104 along with the sleeve member 202 (which abut one another). The user may continue to pull on the sleeve member 202 to fully remove the retainer 200 from the port 104, for example, as shown in FIG. 1C. With the retainer 200 removed, the handle 114 and the slider 116 may be actuated to remove the optoelectronic module 100 from the cage 190.

FIG. 1C illustrates the optoelectronic module 100 with the retainer 200 removed, with the optoelectronic module 100 in a disengaged or unlocked position. When the retainer 200 is not engaged with the optoelectronic module 100 (e.g., by restricting movement of the handle 114), the slider 116 may move with respect to the housing 102 to the disengaged or unlocked position shown. For example, a user may move the slider 116 to the disengaged or unlocked position by pulling on the handle 114, which is coupled to the slider 116.

In the disengaged or unlocked position, the slider 116 may be positioned further along the longitudinal axis 106 away from the cage 190, as shown. In this position, the protrusions 112 of the slider 116 may disengage the tabs 196 of the cage 190 to permit the optoelectronic module 100 to be removed from the cage 190. Furthermore, the slider 116 may not move beyond the disengaged or unlocked position shown, so when the user continues to pull on the handle 114, the entire optoelectronic module 100 will be pulled along with the handle 114, thereby removing the optoelectronic module 100 from the cage 190.

As explained above, the disclosed configurations of the retainer 200 may deactivate or disable the release mechanism of the optoelectronic module 100, to prevent the optoelectronic module 100 from unintentionally releasing from the cage 190, for example, during shipping or transport. In particular, the retainer 200 may be implemented to deactivate or disable the slider 116 release mechanism, thereby preventing the optoelectronic module 100 from being removed from the cage 190, which may be implemented in a network switch. To deactivate or disable the slider 116 release mechanism, the retainer 200 abuts the handle 114 (which in turn is coupled to the slider 116) to prevent the handle 114 to move to the disengaged or unlocked position. Since the retainer 200 abuts the handle 114 and is also secured to the port 104, the handle 114 is prevented from moving to the disengaged or unlocked position until the retainer 200 is removed.

In one example, a method of engaging the retainer 200 with the optoelectronic module 100 may include positioning the occlusion member 208 of the retainer 200 into the corresponding port 104 of the optoelectronic module 100, for example, as shown in FIG. 3A. The method may further include abutting the occlusion member 208 of the retainer 200 against an end of the port 104. The method may include positioning the occlusion member 208 in between the arms 120 of the port 104, as shown in FIG. 3E. The method may include displacing the arms 120 away from one another, for example, by the ramps 218 of the occlusion member 208, as shown in FIG. 3F. The method may include positioning the protrusions 122 of the arms 120 in the indents 220 of the occlusion member 208, as shown in FIG. 3G.

The method may further include sliding the sleeve member 202 with respect to the occlusion member 208 towards the port 104 of the optoelectronic module 100, for example, as shown in FIG. 3C. In some aspects, moving the sleeve member 202 towards the port 104 may include a user pushing on the retainer members 214 in a direction towards the port 104. Additionally or alternatively, the user may push the retainer members 214 towards one another to clear the sides of the recess 222.

The method may include positioning the sleeve member 202 at least partially inside of the port 104, for example, as shown in FIG. 3H. The method may further include surrounding at least a portion of the protrusions 122 of the arms 120 by the sleeve member 202, thereby retaining the protrusions 122 in the indents 220 by preventing the arms 120 from moving apart. The method may further include engaging the occlusion member 208 with both the port 104 and the sleeve member 202 to affix the occlusion member 208 in the port 104. Thus, the method may include cooperatively engaging the occlusion member 208 and the sleeve member 202 with the arms 120 of the port 104 to retain the retainer 200 inside of the port 104.

The method may further include engaging the sleeve member 202 with the occlusion member 208, as shown in FIG. 3D, thereby preventing the sleeve member 202 from moving with respect to the occlusion member 208. Accordingly, the method may include fixing the sleeve member 202, the occlusion member 208 and the port 104 with respect to one another.

The method may further include sliding the ramp members 224 through the recess 222, for example, as shown in FIG. 3C. The method may include retaining the occlusion member 208 and the sleeve member 202 with respect to one another, for example, by the ramp members 224 of the sleeve member 202 abutting the occlusion member 208 proximate the recess 222, as shown in FIG. 3D.

The method may include abutting the sleeve member 202 of the retainer 200 against a portion of the handle 114 to retain both the handle 114 and the slider 116 in a fixed position (e.g., the engaged or locked position) with respect to the housing 102, for example, as shown in FIG. 3H. Accordingly, the method may include engaging the retainer 200 with the port 104 to prevent the handle 114 and the slider 116 from moving with respect to the housing 102 in a direction parallel to the longitudinal axis 106 to the disengaged or unlocked position (e.g., in a direction away from the electrical coupling 108). Thus, the method may include fixing the retainer 200 with respect to both the port 104, the housing 102 and the handle 114.

The method may include retaining the slider 116 with respect to the housing 102 by the retainer 200, since the handle 114 is coupled to the slider 116, which in turn prevents the slider 116 from moving with respect to the housing 102. Thus, the method may include deactivating or disabling the release mechanism of the slider 116, thereby preventing release of the optoelectronic module 100 from the cage 190. Accordingly, the method may include engaging the retainer 200 with both the handle 114 and the housing 102 to retain the slider 116 with respect to the housing 102.

In another example, a method of disengaging the retainer 200 with the optoelectronic module 100 may include displacing the retainer members 214 towards one another (e.g., by a user), which in turn permits the ramp members 224 to clear the surfaces defining the recess 222, for example, as shown in FIG. 3D. With the ramp members 224 clear of the recess 222, the sleeve member 202 may move with respect to the occlusion member 208. Accordingly, the method may include moving the sleeve member 202 with respect to the occlusion member 208, for example, in a direction away from the port 104. In particular, the user may grasp the ends of the retainer members 214 and pull the sleeve member 202 away from the port 104.

As the sleeve member 202 moves away from the port 104, it no longer surrounds or abuts the protrusions 122 of the arms 110 inside of the port 104 (as shown in FIGS. 3H and 3G). Accordingly, the method may include spreading the arms 110 of the port 104 and removing the protrusions 122 from the indents 220. The method may include removing the occlusion member 208 from the port 104, for example, as shown in FIGS. 3F and 3E.

The method may include pulling the sleeve member 202 away from the port 104 such that the sleeve member 202 abuts the occlusion member 208, for example, as shown in FIG. 3B. The method may further include pulling on the sleeve member 202 to remove the occlusion member 208 out of the port 104 along with the sleeve member 202 (which abut one another). The method may further include fully removing the retainer 200 from the port 104 by pulling on the sleeve member 202, for example, as shown in FIG. 1C. With the retainer 200 removed, the handle 114 and the slider 116 may be actuated to remove the optoelectronic module 100 from the cage 190. Accordingly, the method may include positioning the optoelectronic module 100 in a disengaged or unlocked position, for example, when the retainer 200 is not engaged with the optoelectronic module 100. For example, a user may move the slider 116 to the disengaged or unlocked position by pulling on the handle 114, which is coupled to the slider 116.

The method may further include positioning the slider 116 further along the longitudinal axis 106 away from the cage 190, with the optoelectronic module 100 in the disengaged or unlocked position. In this position, the protrusions 112 of the slider 116 may disengage the tabs 196 of the cage 190 to permit the optoelectronic module 100 to be removed from the cage 190. Thus, the method my include removing the optoelectronic module from the cage 190.

Figure 4B:
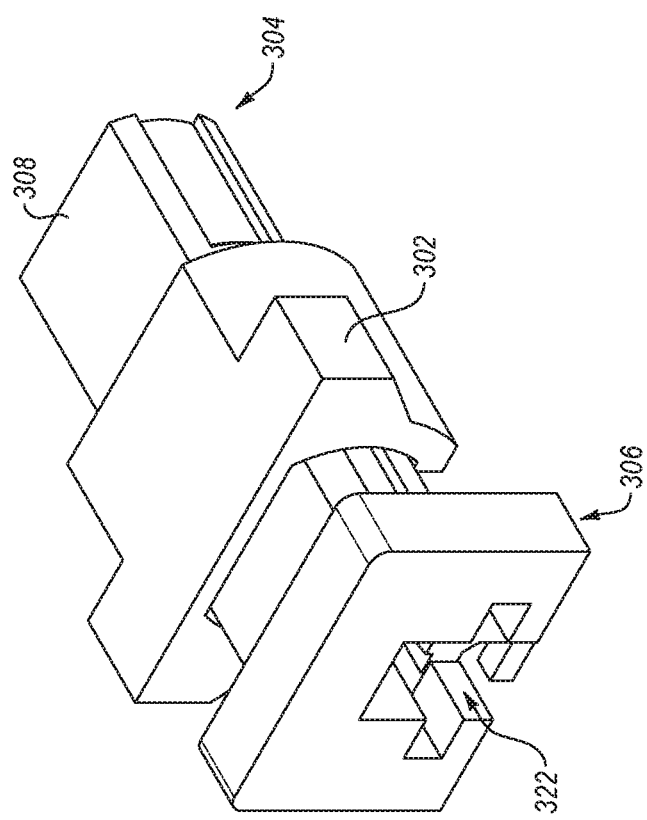
FIGS. 4A and 4B are perspective views of another example of a retainer.
Figure 4A:
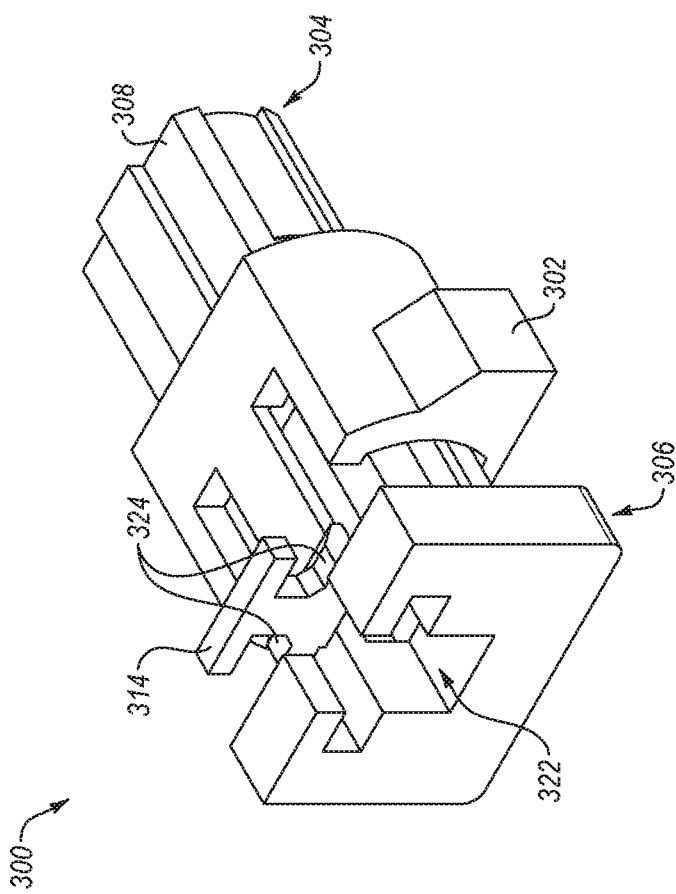

FIGS. 4A and 4B are perspective views of another example of a retainer 300. With attention to FIGS. 4A-4B, the retainer 300 will be described in further detail. The retainer 300 may include any suitable aspects described above with respect to the retainer 200. In particular, the retainer 300 may be implemented to prevent the optoelectronic module 100 from unintentionally disengaging from the cage 190. Further, the retainer 300 may be a combined retainer and plug for the optoelectronic module 100. Thus, the retainer 300 may occlude the port 104 to prevent contaminants such as dust and material from entering the port 104. In addition, the retainer 300 may be configured to deactivate or disable a release mechanism of the optoelectronic module 100, thereby preventing the optoelectronic module 100 from unintentionally releasing from the cage 190. In particular, the retainer 300 may be configured to prevent the slider 116 (and the handle 114) from being moved with respect to the housing 102 or the rest of the optoelectronic module 100 (e.g., in the longitudinal direction) to the disengaged or unlocked position. This in turn prevents the optoelectronic module 100 from being removed from the cage, and from unintentional release from the cage 190.

Although the retainer 300 includes various similarities with respect to the retainer 200 described above, the retainer 300 of FIGS. 4A-4B includes a different configuration of an occlusion member 308 and sleeve member 302. The occlusion member 308 extends between a first end portion 304 and a second end portion 306. The first end portion 304 is substantially similar to the first end portion 204 described above, however, the second end portion 306 includes a differing configuration to interact with the sleeve member 302. In particular, the occlusion member 308 defines an opening 322 sized and shaped to receive a retainer member 314 of the sleeve member 302. In the illustrated configuration, the opening 322 is cross-shaped or t-shaped, and the opening 322 has a shape corresponding to the cross-section of the retainer member 314.

The sleeve member 302 may be configured to move with respect to occlusion member 308. In the illustrated configuration, the sleeve member 302 surrounds the occlusion member 308, and the occlusion member 308 and the sleeve member 302 may be moved (e.g., slid) with respect to one another. Accordingly, the sleeve member 302 may define an opening sized and shaped to receive the occlusion member 308.

The retainer member 314 may be configured to engage with the occlusion member 308 to retain the sleeve member and the occlusion member 308 with respect to one another. The retainer member 314 may be sized and shaped to be manipulated by a user to engage and disengage the sleeve member 302 and the occlusion member 308. As shown, the retainer member 314 may first extend towards the second end portion 306 of the occlusion member 308, and then the retainer member 314 may include a handle member extending perpendicularly or transverse to a longitudinal axis of the sleeve member 302.

The retainer 300, and in particular, the retainer member 314 may be formed of a resilient material (such as a resilient plastic or polymer material). Such configurations may permit the retainer member 314 to be deformed towards the interior of the retainer 300 (e.g. downward), to permit the retainer member 314 to travel through the opening 322 of the occlusion member 308. Thus, the occlusion member 308 and the sleeve member 302 may engage and disengage with one another, which in turn will permit the retainer 300 to engage and disengage with the port 104 of the optoelectronic module 100.

Once positioned to engage the optoelectronic module 100, the retainer member 314 may return to its original position as the retainer member 314 retains the sleeve member 302 and the occlusion member 308 with respect to one another. Further, this position retains the retainer 300 in an engaged or locked position with respect to the port 104. To disengage or unlock the retainer 300 with respect to the housing 102, the retainer member 314 may be displaced inwardly, which may disengage the sleeve member 302 from the occlusion member 308, thereby permitting the retainer 300 to be disengaged from the port 104 of the optoelectronic module 100. Once the retainer members 314 are released by the user, the resilience of the retainer members 314 may return them to their original position (e.g., further apart from one another). Aspects of engaging and disengaging the retainer 300 will be described in further detail below.

The opening 322 may permit the retainer member 314 to move with respect to the occlusion member 308 as the sleeve member 302 moves with respect to the occlusion member 308. However, the retainer member 314 and the opening 322 are configured such that the retainer member 314 may only move through the opening 322 when the retainer member 314 is depressed (e.g., by a user). In the illustrated configuration, the opening 322 is sized and shaped to correspond to the shape of the retainer member 314, such that the retainer member 314 may pass through the opening 322 when depressed. The retainer member 314 may move or slide through the opening 322 as the occlusion member 308 moves with respect the sleeve member 302.

The retainer member 314 may include ramp members 324. The ramp members 324 may permit the retainer member 314 to move through the opening 322 in one direction, but not another. Accordingly, the retainer member 314 may retain the occlusion member 308 and the sleeve member 302 with respect to one another, at least to prevent movement in one direction. Such aspects will be described in further detail below.

Figure 5A:
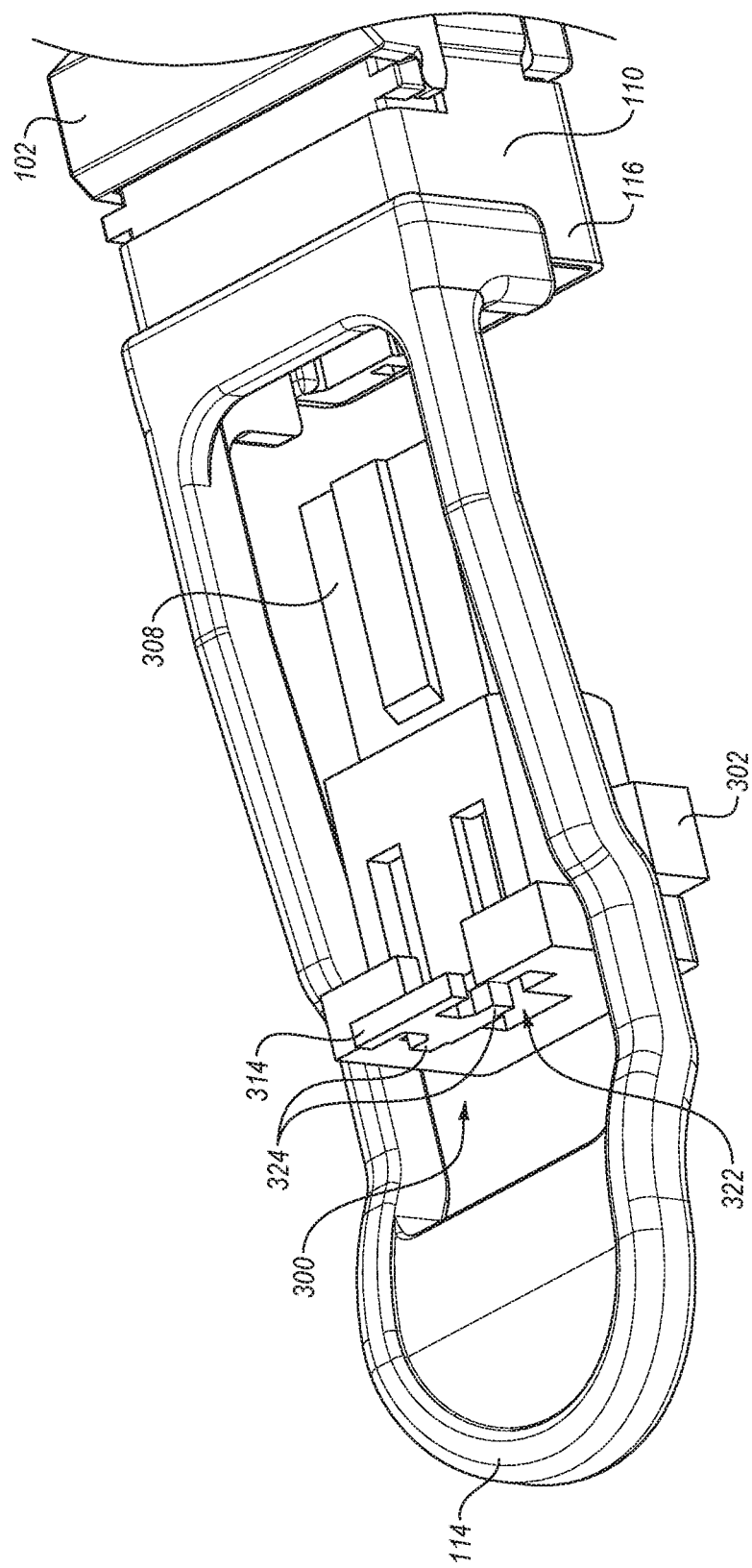
FIGS. 5A-5C are perspective views of a portion of the optoelectronic module and the retainer of FIGS. 4A-4B.
Figure 5B:
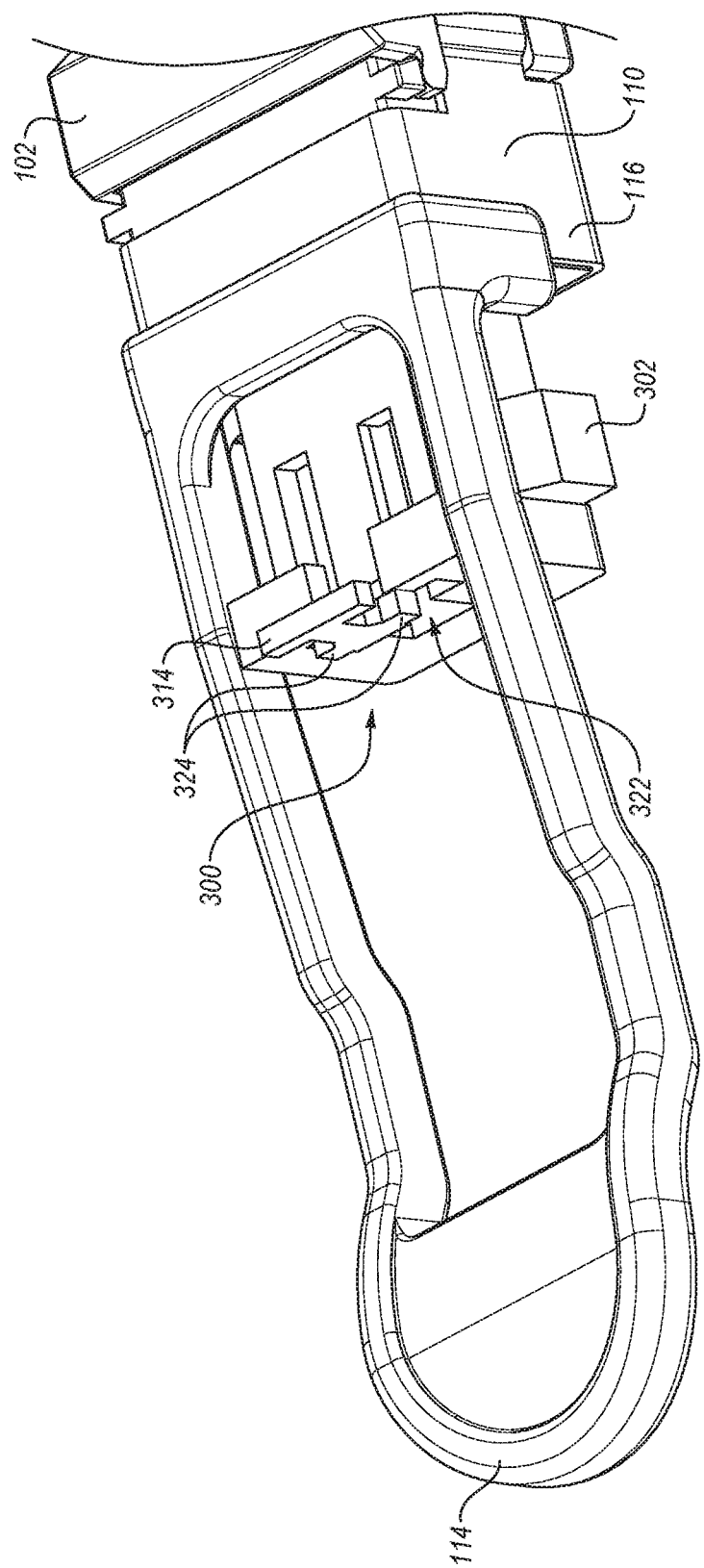
Figure 5C:
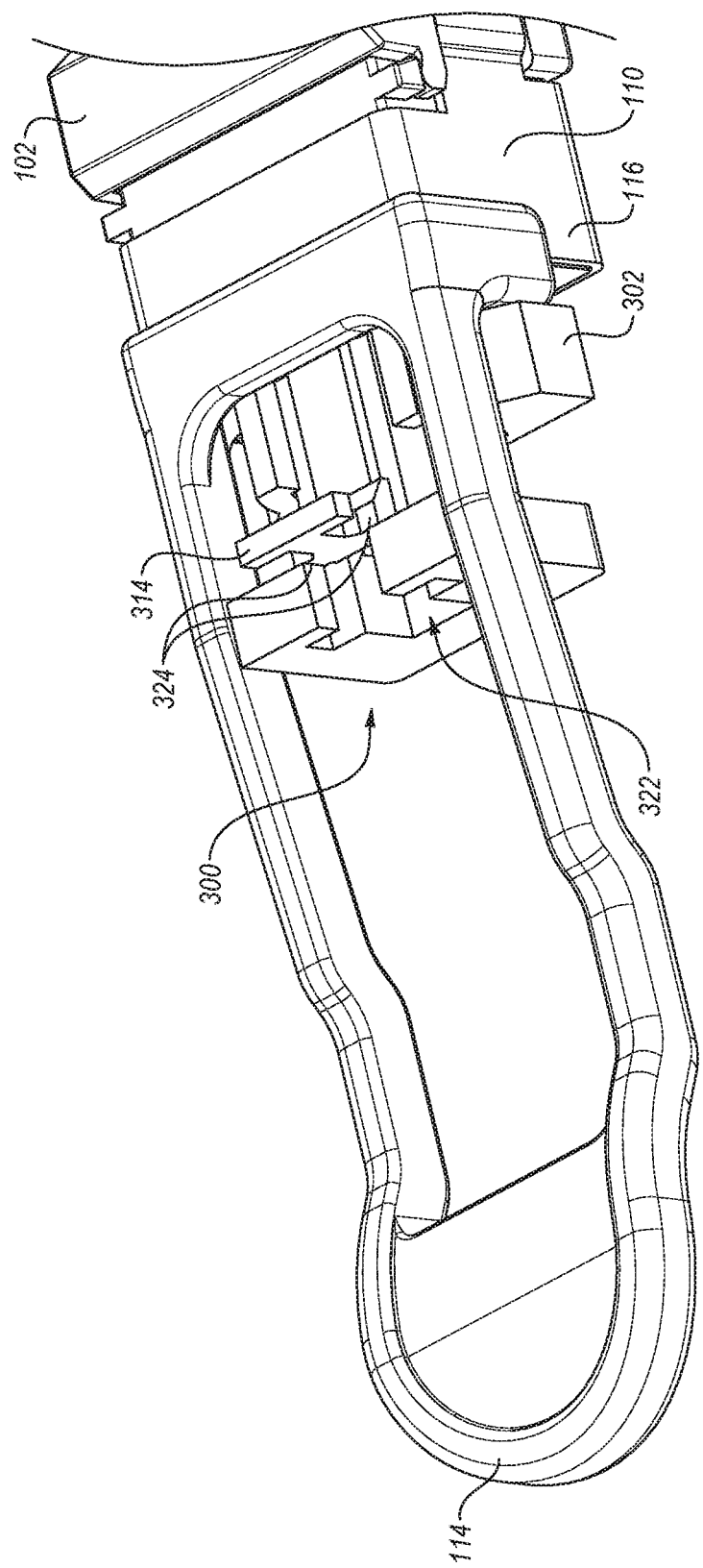
Figure 5D:
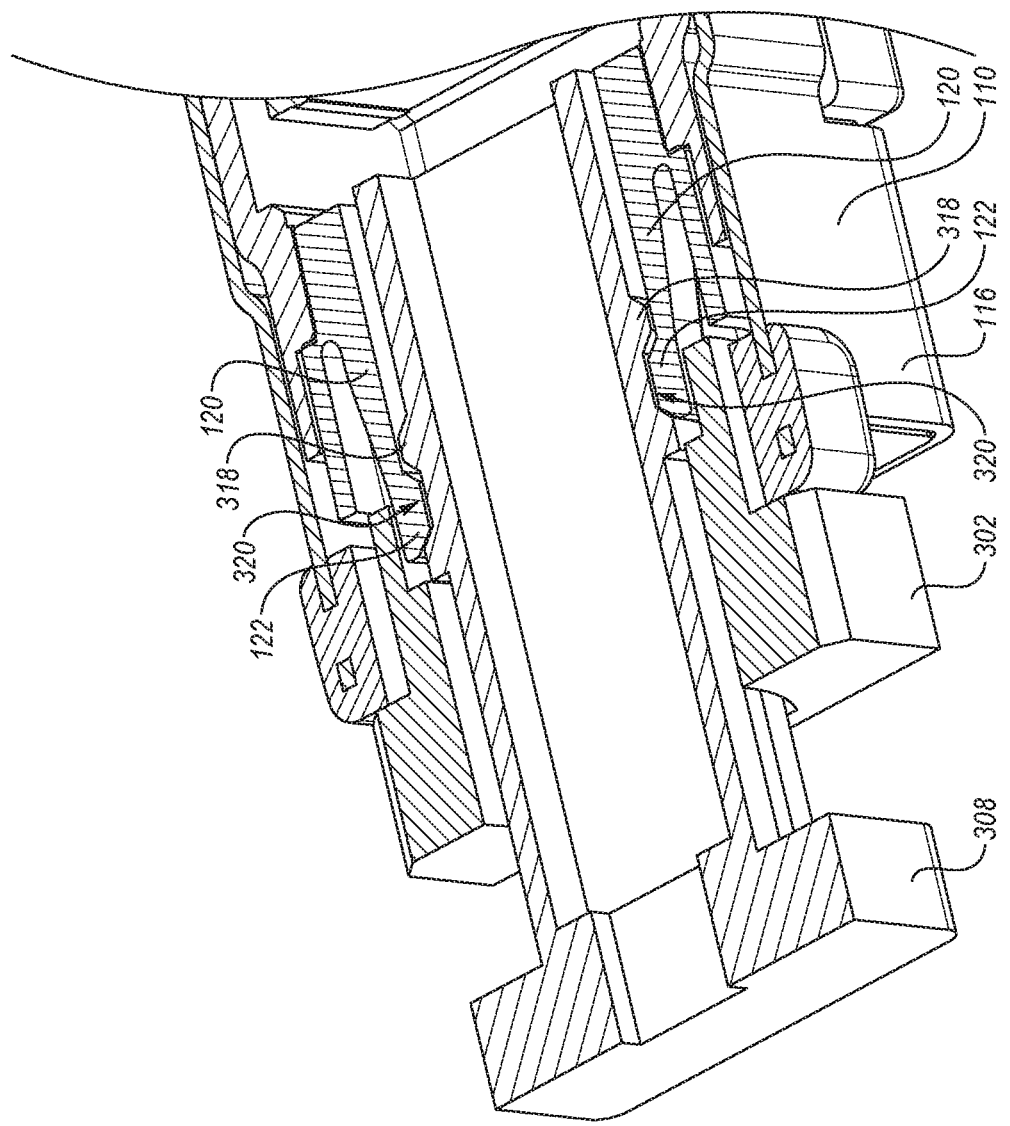
FIG. 5D is a section views of a portion of the optoelectronic module and the retainer of FIGS. 4A-4B.

FIGS. 5A-5C are perspective views of a portion of the optoelectronic module 100 and the retainer 300, and FIG. 5D is a section views of a portion of the optoelectronic module 100 and the retainer 300. With attention to FIGS. 5A-5D, engaging and disengaging the retainer 300 and the optoelectronic module 100 will be described in further detail.

As shown in FIG. 5A, engaging the retainer 200 may begin by positioning the occlusion member 308 in the port 104 of the optoelectronic module 100. In particular, the first end portion 304 of the occlusion member 308 may be positioned in the port 104. FIG. 5B illustrates the occlusion member 308 positioned further in the port 104. In this position the occlusion member 308 may occlude the port 104 and abut the interior of the port 104 such that occlusion member 308 cannot be positioned further in the port 104. In the position shown in FIG. 5B, the sleeve member 302 is positioned outside of the port 104, in a position furthest away from the optoelectronic module 100.

Once the occlusion member 308 is positioned fully inside of the port 104 (e.g., to abut the end of the port 104), the sleeve member 302 may be displaced towards the optoelectronic module 100, or displaced at least partially inside of the port 104. The sleeve member 302 may be displaced, for example, by a user pushing on the end of the retainer member 314 in a direction toward the port 104 or the optoelectronic module 100. As shown, as the sleeve member 302 moves towards the port 104, the ramp members 324 displace the retainer member 314 downward or towards the interior of the sleeve member 302. In particular, the ramp members 324 push the retainer member 314 downward as the sleeve member 302 moves through the opening 322 towards the port 104. Thus, ramp surfaces of the ramp members 324 abut against walls defining the opening 322 to push the retainer member 314 downward. Additionally or alternatively, the user may displace the retainer member 314 downward, for example, by pushing on the end of the retainer member 314, as the user moves the sleeve member 302 towards the port 104. In such circumstances, the retainer members 314 may move unobstructed through the opening 322.

FIG. 5D illustrates the sleeve member 302 positioned further towards the port 104. As shown, once the ramp members 324 move past or clear the opening 322, the retainer member 314 may return to its original position (e.g., by virtue of the resilience of the retainer member 314). In this position, surfaces of the ramp members 324 abut the occlusion member 308, thereby preventing the sleeve member 302 from moving with respect to the occlusion member 308 in a direction away from the port 104.

As discussed above, the first end portion 304 of the occlusion member 308 is substantially similar to the occlusion member 208 described above. Accordingly, the occlusion member 308 may engage with the port 104 in a similar manner as described with respect to FIGS. 3E-3H. For example, as shown in FIG. 5D, the occlusion member 308 may include ramps 318 and indents 320 to receive the protrusions 122 of the arms 120 of the port 104.

When the sleeve member 302 is positioned into the port 104, the sleeve member 302 may surround at least a portion of the protrusions 122, thereby retaining the protrusions 122 in the indents 320 by preventing the arms 120 from moving apart. In the illustrated position, the occlusion member 308 is engaged with the port 104, and the sleeve member 302 prevents the occlusion member 308 from disengaging from the port 104. Furthermore, as shown in FIG. 5C, the sleeve member 302 is also engaged with the occlusion member 308, thereby preventing the sleeve member 302 from moving with respect to the occlusion member 308. In this position, the sleeve member 302, the occlusion member 308 and the port 104 are fixed with respect to one another.

Furthermore, the sleeve member 302 of the retainer 300 abuts a portion of the handle 114 to retain both the handle 114 and the slider 116 in a fixed position (e.g., the engaged or locked position) with respect to the housing 102. Thus, the retainer 300 is engaged with the port 104 and prevents the handle 114 and the slider 116 from moving with respect to the housing 102 in a direction parallel to the longitudinal axis 106 to the disengaged or unlocked position (e.g., in a direction away from the electrical coupling 108). Thus, the retainer 300 is fixed with respect to both the port 104, the housing 102 and the handle 114.

Since the handle 114 is coupled to the slider 116, the retainer 300 also retains the slider 116 with respect to the housing 102. This in turn prevents the slider 116 from moving with respect to the housing 102 to deactivate or disable the release mechanism of the slider 116, thereby preventing release of the optoelectronic module 100 from the cage 190.

To remove or disengage the retainer 300 from the optoelectronic module 100, the retainer members 314 may be displaced downwards (e.g., by a user), which in turn permits the ramp member 324 to clear the surfaces defining the opening 322. With the ramp member 324 clear of the opening 322, the sleeve member 302 may move with respect to the occlusion member 308, for example, in a direction away from the port 104. Thus, the user may continue to grasp the end of the retainer member 314 and pull the sleeve member 302 away from the port 104.

As the sleeve member 302 moves away from the port 104, it no longer surrounds or abuts the protrusions 122 of the arms 110 inside of the port 104. This in turn permits the arms 110 to spread apart and also permits the protrusions 122 to be removed from the indents 320. Once the arms 110 are able to spread apart unobstructed, the occlusion member 308 may be removed from the port 104. As the user continues to pull the sleeve member 302 away from the port 104, the sleeve member 302 may eventually abut the occlusion member 308. Then if the user continues to pull on the sleeve member 302, the user will pull the occlusion member 308 out of the port 104 along with the sleeve member 302 (which abut one another). The user may continue to pull on the sleeve member 302 to fully remove the retainer 300 from the port 104.

When the retainer 300 is removed, the optoelectronic module 100 is in a disengaged or unlocked position, as described above. Thus, the handle 114 and the slider 116 may be actuated to remove the optoelectronic module 100 from the cage 190. As explained above, the disclosed configurations of the retainer 300 may deactivate or disable the release mechanism of the optoelectronic module 100, to prevent the optoelectronic module 100 from unintentionally releasing from the cage 190, for example, during shipping or transport.

In one example, a method of engaging the retainer 300 with the optoelectronic module 100 may include the aspects described above with respect to the method of engaging the retainer 200, except the method may be modified to account for the different configuration of the sleeve member 302 and the occlusion member 308. For example, the method may include pushing the retainer member 314 downward to clear the opening 322 (rather than inward). The method may further include sliding the ramp members 324 through the opening 322.

In another example, a method of disengaging the retainer 300 with the optoelectronic module 100 may include the aspects described above with respect to the method of engaging the retainer 200, except the method may be modified to account for the different configuration of the sleeve member 302 and the occlusion member 308. For example, the retainer member 314 may displaced downwards or towards the interior of the sleeve member 302 to permit the ramp members 324 to clear the surfaces defining the opening 322. With the ramp members 324 clear of the opening 322, the sleeve member 302 may move with respect to the occlusion member 308. Accordingly, the sleeve member 302 may then be moved with respect to the occlusion member 308, for example, in a direction away from the port 104. In particular, the user may grasp the end of the retainer member 314 and pull the sleeve member 302 away from the port 104.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more."

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic module comprising:
   a housing enclosing at least one optical transmitter or receiver;
   a release mechanism configured to engage with a cage sized and shaped to receive the housing; and
   a retainer including at least one occlusion member sized and shaped to be positioned inside a port of the optoelectronic module and including a sleeve member configured to slide with respect to the occlusion member, the at least one occlusion member being configured to engage in the port and being configured to occlude the port, the sleeve member being configured to retain the at least one occlusion member engaged in the port and being configured to retain the release mechanism engaged with the cage.

2. The optoelectronic module of claim 1, wherein the at least one occlusion member and the sleeve member are configured to engage one another to retain the at least one occlusion member and the sleeve member with respect to one another.

3. The optoelectronic module of claim 1, wherein the at least one occlusion member and the sleeve member cooperatively engage with arms of the port to retain the retainer inside of the port.

4. The optoelectronic module of claim 1, wherein the sleeve member is configured to abut a handle of the optoelectronic module when the sleeve member is positioned in the port.

5. The optoelectronic module of claim 1, wherein the sleeve member is configured to at least partially surround arms of the port to retain the arms inside of indents defined by the at least one occlusion member when the sleeve member is positioned in the port.

6. The optoelectronic module of claim 1, wherein the sleeve member defines an opening sized and shaped to receive the at least one occlusion member.

7. The optoelectronic module of claim 1, the release mechanism comprising:
   a slider configured to move with respect to the housing, the slider including at least one protrusion configured to engage the cage; and
   a handle coupled to the slider to actuate the slider;
   wherein the retainer is configured to engage both the handle and the port to retain both the handle and the slider with respect to the housing.

8. The optoelectronic module of claim 7, wherein the slider includes a protrusion configured to engage a corresponding resilient tab of the cage.

9. The optoelectronic module of claim 7, wherein the retainer disables a release mechanism of the slider when engaged with the handle and the port.

10. The optoelectronic module of claim 1, the at least one occlusion member comprising a ramp and an indent sized and shaped to receive a protrusion positioned on an arm of the port.

11. The optoelectronic module of claim 1, the at least one occlusion member comprising a protrusion corresponding to a recess defined by the sleeve member.

12. The optoelectronic module of claim 1, the sleeve member comprising at least one retainer member configured to engage with the at least one occlusion member to retain the sleeve member and the at least one occlusion member with respect to one another.

13. The optoelectronic module of claim 1, the sleeve member comprising two resilient retainer members extending substantially parallel to one another, the retainer members including ramp members that permit the retainer members to move through a recess defined by the sleeve member in one direction.

14. The optoelectronic module of claim 11, the sleeve member including a resilient retainer member, and the at least one occlusion member defining an opening sized and shaped to receive the retainer member, the retainer member including ramp members that permit the retainer member to move through the opening in one direction.

15. A method comprising:
   occluding a port of an optoelectronic module by positioning an occlusion member of a retainer into the port of the optoelectronic module and engaging the occlusion member inside the port;
   sliding a sleeve member with respect to the occlusion member towards the port of the optoelectronic module;
   cooperatively engaging the occlusion member and the sleeve member with the port to retain the occlusion member of the retainer engaged inside of the port; and
   disabling a release mechanism of the optoelectronic module by retaining the release mechanism using the sleeve member.

16. The method of claim 15, further comprising engaging the sleeve member with the occlusion member to prevent the sleeve member from moving with respect to the occlusion member.

17. The method of claim 15, wherein engaging the occlusion member inside the port comprises:
   positioning the occlusion member in between arms of the port;
   displacing the arms of the port away from one another by ramps of the occlusion member; and
   positioning protrusions of arms of the port in indents defined by the occlusion member.

18. The method of claim 17, wherein cooperatively engaging the occlusion member and the sleeve member with the port to retain the occlusion member of the retainer engaged inside of the port comprises surrounding at least a portion of the protrusions of the arms by the sleeve member, thereby retaining the protrusions in the indents by preventing the arms from moving apart.

19. The method of claim 15, wherein retaining the release mechanism using the sleeve member comprises abutting the sleeve member against a portion of a handle of the release mechanism of the optoelectronic module to retain the handle in a fixed position with respect to a housing of the optoelectronic module.

20. The method of claim 15, wherein disabling the release mechanism of the optoelectronic module comprises disabling the release mechanism of a slider of the optoelectronic module to prevent release of the optoelectronic module from a cage.

* * * * *